(12) United States Patent
Elshafie et al.

(10) Patent No.: US 12,556,316 B2
(45) Date of Patent: Feb. 17, 2026

(54) CONFIGURABLE MINI-SLOT RETRANSMISSIONS IN SIDELINK COMMUNICATIONS

(71) Applicant: QUALCOMM Incorporated, San Diego, CA (US)

(72) Inventors: Ahmed Elshafie, San Diego, CA (US); Seyedkianoush Hosseini, San Diego, CA (US); Wei Yang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 583 days.

(21) Appl. No.: 18/046,486

(22) Filed: Oct. 13, 2022

(65) Prior Publication Data
US 2024/0129070 A1    Apr. 18, 2024

(51) Int. Cl.
*H04W 72/20* (2023.01)
*H04L 1/1829* (2023.01)

(52) U.S. Cl.
CPC .......... *H04L 1/1854* (2013.01); *H04W 72/20* (2023.01)

(58) Field of Classification Search
CPC ... H04L 1/1822; H04L 1/1854; H04L 1/1893; H04W 72/0453; H04W 72/25; H04W 72/40; H04W 72/1278
USPC ......................................... 370/230, 329, 330
See application file for complete search history.

(56) References Cited

U.S. PATENT DOCUMENTS

| | | | |
|---|---|---|---|
| 2020/0412485 A1* | 12/2020 | Wang ..................... | H04L 1/1854 |
| 2021/0144750 A1* | 5/2021 | Cao .................... | H04W 72/0453 |
| 2023/0254831 A1* | 8/2023 | Su ........................ | H04W 72/40 370/329 |
| 2024/0049253 A1* | 2/2024 | Zhou ..................... | H04W 72/40 |

FOREIGN PATENT DOCUMENTS

WO    WO-2024000584 A1 *    1/2024    ........... H04L 1/1893

* cited by examiner

*Primary Examiner* — Harun Chowdhury
(74) *Attorney, Agent, or Firm* — Holland & Hart LLP

(57) ABSTRACT

Methods, systems, and devices for wireless communications are described. Generally, the described techniques provide for a user equipment (UE) to determine a retransmission pattern within a slot based on a transport block retransmission selection scheme. In some cases, the UE may be allocated sub-slots within a slot for retransmitting multiple transport blocks, and may determine how to utilize a sub-slot allocated for a retransmission of a transport block that is not to be retransmitted. For example, the UE may transmit a new transport block via an unutilized sub-slot, or may repeat a retransmission of a transport block via the unutilized sub-slot in addition to an allocated sub-slot. Additionally, or alternatively, unutilized sub-slots may be re-allocated to other UEs via signaling from a network entity or coordination between sidelink UEs.

19 Claims, 13 Drawing Sheets

CONFIGURABLE MINI-SLOT RETRANSMISSIONS IN SIDELINK COMMUNICATIONS

FIELD OF TECHNOLOGY

The following relates to wireless communications, including configurable mini-slot retransmissions in sidelink communications.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

In some wireless communications systems, UEs may communicate directly with one another in a sidelink communications mode. A UE may reserve sidelink resources for communications by indicating, to one or more other UEs, frequency resources (e.g., a number of subchannels) reserved by the UE for one or more slots. However, in some cases, slot-based sidelink reservations may fail to support efficient resource usage, for example, if multiple different UEs are contending for the sidelink resources. Additionally, or alternatively, using slot-based sidelink reservations may cause UEs to fail to satisfy latency thresholds for communications (e.g., based on relatively few slot-based reservation opportunities).

SUMMARY

The described techniques relate to improved methods, systems, devices, and apparatuses that support configurable mini-slot retransmissions in sidelink communications. For example, the described techniques provide for improved sidelink resource usage and reduced sidelink communication latency. In some wireless communications systems, a user equipment (UE) may refrain from retransmitting one or more transport blocks (TBs) despite being allocated resources for such retransmissions. The UE may determine a retransmission pattern within a slot (e.g., utilizing sub-slots of the slot) based on a TB retransmission selection scheme. For example, the UE may transmit a new TB via a unutilized sub-slot, or may repeat a retransmission of a TB via the unutilized sub-slot in addition to an allocated sub-slot. Additionally, or alternatively, unutilized sub-slots may be re-allocated to other UEs via signaling from a network entity or coordination between sidelink UEs.

A method for wireless communication at a user equipment (UE) is described. The method may include transmitting, via sidelink, a set of multiple sidelink TBs in a set of multiple sub-intervals of a first time interval, communicating an indication that a subset of sub-intervals of a second time interval are scheduled for retransmission, the second time interval occurring after the first time interval, and transmitting a first sidelink TB of the set of multiple sidelink TBs via a first sub-interval of the subset of sub-intervals of the second time interval in accordance with a TB retransmission selection scheme, where the TB retransmission selection scheme indicates to select the first sidelink TB for retransmission in the first sub-interval based on a parameter associated with the first sidelink TB.

An apparatus for wireless communication at a UE is described. The apparatus may include a processor, memory coupled with the processor, and instructions stored in the memory. The instructions may be executable by the processor to cause the apparatus to transmit, via sidelink, a set of multiple sidelink TBs in a set of multiple sub-intervals of a first time interval, communicate an indication that a subset of sub-intervals of a second time interval are scheduled for retransmission, the second time interval occurring after the first time interval, and transmit a first sidelink TB of the set of multiple sidelink TBs via a first sub-interval of the subset of sub-intervals of the second time interval in accordance with a TB retransmission selection scheme, where the TB retransmission selection scheme indicates to select the first sidelink TB for retransmission in the first sub-interval based on a parameter associated with the first sidelink TB.

Another apparatus for wireless communication at a UE is described. The apparatus may include means for transmitting, via sidelink, a set of multiple sidelink TBs in a set of multiple sub-intervals of a first time interval, means for communicating an indication that a subset of sub-intervals of a second time interval are scheduled for retransmission, the second time interval occurring after the first time interval, and means for transmitting a first sidelink TB of the set of multiple sidelink TBs via a first sub-interval of the subset of sub-intervals of the second time interval in accordance with a TB retransmission selection scheme, where the TB retransmission selection scheme indicates to select the first sidelink TB for retransmission in the first sub-interval based on a parameter associated with the first sidelink TB.

A non-transitory computer-readable medium storing code for wireless communication at a UE is described. The code may include instructions executable by a processor to transmit, via sidelink, a set of multiple sidelink TBs in a set of multiple sub-intervals of a first time interval, communicate an indication that a subset of sub-intervals of a second time interval are scheduled for retransmission, the second time interval occurring after the first time interval, and transmit a first sidelink TB of the set of multiple sidelink TBs via a first sub-interval of the subset of sub-intervals of the second time interval in accordance with a TB retransmission selection scheme, where the TB retransmission selection scheme indicates to select the first sidelink TB for retransmission in the first sub-interval based on a parameter associated with the first sidelink TB.

Some examples of the method, apparatuses, and non-transitory computer-readable medium described herein may further include operations, features, means, or instructions for receiving, from at least one other UE, a bitmap including feedback information for the set of multiple sidelink TB s, where communicating the indication that the subset of sub-intervals of the second time interval may be scheduled for retransmission may be based on receiving the bitmap.

Some examples of the method, apparatuses, and non-transitory computer-readable medium described herein may further include operations, features, means, or instructions for receiving a negative acknowledgment (NACK) for a second sidelink TB of the set of multiple sidelink TB s communicated via a sub-interval of the first time interval and transmitting, in accordance with the TB retransmission selection scheme, the first sidelink TB via the first sub-interval based on receiving the NACK, where the first sub-interval corresponds to the sub-interval for the first time interval and the first sidelink TB may be a retransmission of the second sidelink TB.

Some examples of the method, apparatuses, and non-transitory computer-readable medium described herein may further include operations, features, means, or instructions for receiving an acknowledgement (ACK) for a second sidelink TB communicated via a sub-interval of the first time interval and transmitting a third sidelink TB via a second sub-interval of the subset of sub-intervals of the second time interval that corresponds to the sub-interval of the first time interval, where the third sidelink TB may be different than the second sidelink TB.

Some examples of the method, apparatuses, and non-transitory computer-readable medium described herein may further include operations, features, means, or instructions for transmitting a sidelink control information (SCI) message including a new data indicator (NDI), a hybrid automatic repeat request identifier (HARQ ID), or both, associated with the third sidelink TB.

Some examples of the method, apparatuses, and non-transitory computer-readable medium described herein may further include operations, features, means, or instructions for receiving an ACK for a second sidelink TB communicated via a sub-interval of the first time interval and transmitting, in accordance with the TB retransmission selection scheme, the first sidelink TB via the first sub-interval and a second sub-interval of the subset of sub-intervals of the second time interval, the second sub-interval corresponding to the sub-interval of the first time interval.

Some examples of the method, apparatuses, and non-transitory computer-readable medium described herein may further include operations, features, means, or instructions for transmitting the first sidelink TB via the first sub-interval according to a first channel coding rate and transmitting the first sidelink TB via the second sub-interval according to a second channel coding rate that differs from the first channel coding rate.

Some examples of the method, apparatuses, and non-transitory computer-readable medium described herein may further include operations, features, means, or instructions for transmitting the first sidelink TB via the first sub-interval and the second sub-interval may be based on a first priority, a first quality service, or both associated with the first sidelink TB being equal to or higher than a second priority, a second quality of service (QoS), or both associated with the second sidelink TB.

Some examples of the method, apparatuses, and non-transitory computer-readable medium described herein may further include operations, features, means, or instructions for transmitting the first sidelink TB via the first sub-interval and the second sub-interval may be based on a first remaining packet delay budget (PDB) associated with the first sidelink TB being lower than a second remaining PDB associated with a third sidelink TB of the set of multiple sidelink TBs.

Some examples of the method, apparatuses, and non-transitory computer-readable medium described herein may further include operations, features, means, or instructions for transmitting the first sidelink TB via the first sub-interval and the second sub-interval may be based on one or more resources associated with the first sidelink TB overlapping with one or more resources associated with the second sidelink TB.

In some examples of the method, apparatuses, and non-transitory computer-readable medium described herein, the TB retransmission selection scheme indicates to refrain from retransmitting a second sidelink TB of the set of multiple sidelink TB s based on a PDB for the second sidelink TB expiring.

In some examples of the method, apparatuses, and non-transitory computer-readable medium described herein, the parameter associated with the first sidelink TB includes a priority associated with the first sidelink TB, a QoS associated with the first sidelink TB, a remaining PDB for the first sidelink TB, a size of a payload associated with the first sidelink TB, a quantity of time-frequency resources associated with the first sidelink TB, or any combination thereof.

Some examples of the method, apparatuses, and non-transitory computer-readable medium described herein may further include operations, features, means, or instructions for receiving a message indicating a configuration for a resource pool for at least the first time interval and the second time interval, where the TB retransmission selection scheme may be based on the configuration.

In some examples of the method, apparatuses, and non-transitory computer-readable medium described herein, the message may be received via a Layer-1 message, a Layer-2 message, or a Layer-3 message.

In some examples of the method, apparatuses, and non-transitory computer-readable medium described herein, the first time interval includes a slot and the set of multiple sub-intervals include a set of multiple sub-slots.

A method for wireless communication at a UE is described. The method may include receiving, via sidelink, a set of multiple sidelink TBs in a set of multiple sub-intervals of a first time interval, receiving an indication that a subset of sub-intervals of a second time interval are scheduled for retransmission, the second time interval occurring after the first time interval, and monitoring for a first sidelink TB of the set of multiple sidelink TBs via a first sub-interval of the subset of sub-intervals of the second time interval in accordance with a TB retransmission selection scheme, where the TB retransmission selection scheme indicates the first sidelink TB is selected for retransmission in the first sub-interval based on a parameter associated with the first sidelink TB.

An apparatus for wireless communication at a UE is described. The apparatus may include a processor, memory coupled with the processor, and instructions stored in the memory. The instructions may be executable by the processor to cause the apparatus to receive, via sidelink, a set of multiple sidelink TBs in a set of multiple sub-intervals of a first time interval, receive an indication that a subset of sub-intervals of a second time interval are scheduled for retransmission, the second time interval occurring after the first time interval, and monitor for a first sidelink TB of the set of multiple sidelink TBs via a first sub-interval of the subset of sub-intervals of the second time interval in accordance with a TB retransmission selection scheme, where the TB retransmission selection scheme indicates the first sidelink TB is selected for retransmission in the first sub-interval based on a parameter associated with the first sidelink TB.

Another apparatus for wireless communication at a UE is described. The apparatus may include means for receiving, via sidelink, a set of multiple sidelink TB s in a set of multiple sub-intervals of a first time interval, means for receiving an indication that a subset of sub-intervals of a second time interval are scheduled for retransmission, the second time interval occurring after the first time interval, and means for monitoring for a first sidelink TB of the set of multiple sidelink TBs via a first sub-interval of the subset of sub-intervals of the second time interval in accordance with a TB retransmission selection scheme, where the TB retransmission selection scheme indicates the first sidelink TB is selected for retransmission in the first sub-interval based on a parameter associated with the first sidelink TB.

A non-transitory computer-readable medium storing code for wireless communication at a UE is described. The code may include instructions executable by a processor to receive, via sidelink, a set of multiple sidelink TBs in a set of multiple sub-intervals of a first time interval, receive an indication that a subset of sub-intervals of a second time interval are scheduled for retransmission, the second time interval occurring after the first time interval, and monitor for a first sidelink TB of the set of multiple sidelink TBs via a first sub-interval of the subset of sub-intervals of the second time interval in accordance with a TB retransmission selection scheme, where the TB retransmission selection scheme indicates the first sidelink TB is selected for retransmission in the first sub-interval based on a parameter associated with the first sidelink TB.

Some examples of the method, apparatuses, and non-transitory computer-readable medium described herein may further include operations, features, means, or instructions for transmitting, to at least one other UE, a bitmap including feedback information for the set of multiple sidelink TB s, where receiving the indication that the subset of sub-intervals of the second time interval may be scheduled for retransmission may be based on transmitting the bitmap.

Some examples of the method, apparatuses, and non-transitory computer-readable medium described herein may further include operations, features, means, or instructions for transmitting a NACK for a second sidelink TB of the set of multiple sidelink TBs communicated via a sub-interval of the first time interval and receiving, in accordance with the TB retransmission selection scheme, the first sidelink TB via the first sub-interval based on receiving the NACK, where the first sub-interval corresponds to the sub-interval for the first time interval and the first sidelink TB may be a retransmission of the second sidelink TB.

Some examples of the method, apparatuses, and non-transitory computer-readable medium described herein may further include operations, features, means, or instructions for transmitting an ACK for a second sidelink TB communicated via a sub-interval of the first time interval and receiving a third sidelink TB via a second sub-interval of the subset of sub-intervals of the second time interval that corresponds to the sub-interval of the first time interval, where the third sidelink TB may be different than the second sidelink TB.

Some examples of the method, apparatuses, and non-transitory computer-readable medium described herein may further include operations, features, means, or instructions for receiving a SCI message including a NDI, a HARQ ID, or both, associated with the third sidelink TB.

Some examples of the method, apparatuses, and non-transitory computer-readable medium described herein may further include operations, features, means, or instructions for transmitting an ACK for a second sidelink TB communicated via a sub-interval of the first time interval and receiving, in accordance with the TB retransmission selection scheme, the first sidelink TB via the first sub-interval and a second sub-interval of the subset of sub-intervals of the second time interval, the second sub-interval corresponding to the sub-interval of the first time interval.

Some examples of the method, apparatuses, and non-transitory computer-readable medium described herein may further include operations, features, means, or instructions for receiving the first sidelink TB via the first sub-interval according to a first channel coding rate and receiving the first sidelink TB via the second sub-interval according to a second channel coding rate that differs from the first channel coding rate.

Some examples of the method, apparatuses, and non-transitory computer-readable medium described herein may further include operations, features, means, or instructions for receiving the first sidelink TB via the first sub-interval and the second sub-interval may be based on a first priority, a first quality service, or both associated with the first sidelink TB being equal to or higher than a second priority, a second QoS, or both associated with the second sidelink TB.

Some examples of the method, apparatuses, and non-transitory computer-readable medium described herein may further include operations, features, means, or instructions for receiving the first sidelink TB via the first sub-interval and the second sub-interval may be based on a first remaining PDB associated with the first sidelink TB being lower than a second remaining PDB associated with a third sidelink TB of the set of multiple sidelink TBs.

Some examples of the method, apparatuses, and non-transitory computer-readable medium described herein may further include operations, features, means, or instructions for receiving the first sidelink TB via the first sub-interval and the second sub-interval may be based on one or more resources associated with the first sidelink TB overlapping with one or more resources associated with the second sidelink TB.

In some examples of the method, apparatuses, and non-transitory computer-readable medium described herein, the parameter associated with the first sidelink TB includes a priority associated with the first sidelink TB, a QoS associated with the first sidelink TB, a remaining PDB for the first sidelink TB, a size of a payload associated with the first sidelink TB, a quantity of time-frequency resources associated with the first sidelink TB, or any combination thereof.

Some examples of the method, apparatuses, and non-transitory computer-readable medium described herein may further include operations, features, means, or instructions for receiving a message indicating a configuration for a resource pool including at least the first time interval and the second time interval, where the TB retransmission selection scheme may be based on the configuration.

In some examples of the method, apparatuses, and non-transitory computer-readable medium described herein, the message may be received via a Layer-1 message, a Layer-2 message, or a Layer-3 message.

DETAILED DESCRIPTION

Figure 1:
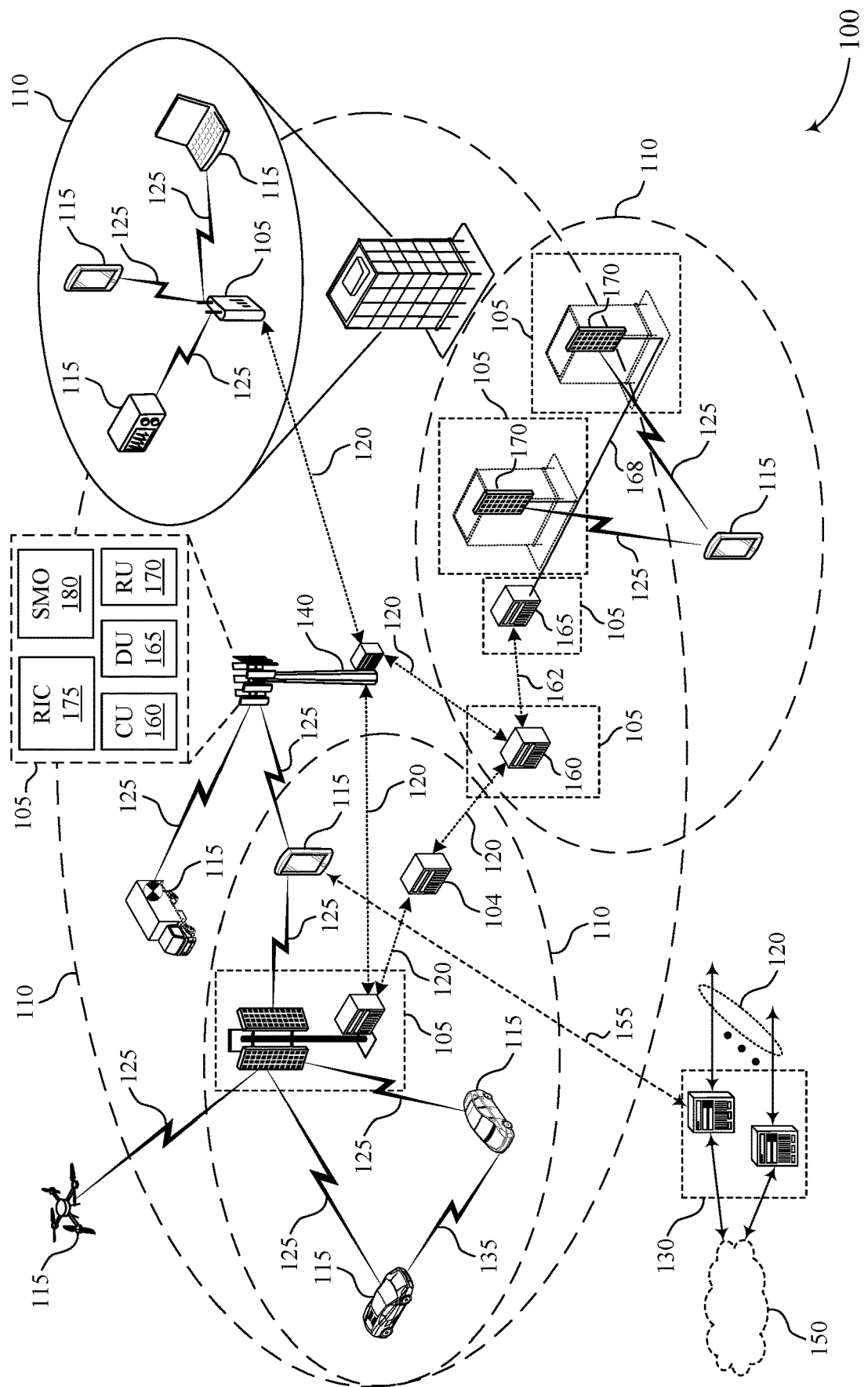
FIG. 1 illustrates an example of a wireless communications system that supports configurable mini-slot retransmissions in sidelink communications in accordance with one or more aspects of the present disclosure.

In some wireless communications systems, multiple user equipments (UEs), may communicate directly with one another in a sidelink communications mode. A sidelink UE may reserve resources for an initial transmission of a data payload (e.g., a transport block (TB)) and up to two retransmissions of the data payload (e.g., to increase the likelihood that the data payload is successfully received). That is, the UE may indicate, to one or more other UEs, a quantity of subchannels (e.g., a frequency resource) and a corresponding slot (e.g., a time resource) for each reserved resource. In some cases, sidelink UEs may reserve resources at one or more fractional portions of a slot (e.g., one or more sub-slots or mini-slots) to transmit one or more TBs. For example, a sidelink UE may reserve a first sub-slot of a slot for transmission of a first TB, may reserve a second sub-slot of the slot for transmission of a second TB, and so on (e.g., until reaching a capacity of the slot). The sidelink UE may make similar reservations for retransmissions of the one or more TBs, and thus may be allocated resources for the retransmissions of the one or more TBs prior to an initial transmission of the one or more TBs. In some cases, however, the UE may receive a positive feedback (e.g., a hybrid automatic repeat request (HARQ) acknowledgment (HARQ-ACK)) corresponding to an initial transmission of a TB, and may be allocated resources (e.g., a sub-slot of a subsequent slot) for a retransmission of the TB, despite successful reception of the initial transmission of the TB. In such a case, the UE may utilize a sub-slot for retransmitting a successfully received TB, or may refrain from performing communications at the sub-slot, which may result in an inefficient usage of resources.

To support configurable sub-slot utilization for retransmissions at a UE, the UE may determine one or more TBs to transmit via a slot including one or more reserved sub-slots (e.g., allocated for the UE). In some examples, the UE may receive an indication that a subset of sub-slots are to be retransmitted. That is, the UE may transmit, in a first slot, a set TBs corresponding to multiple sub-slots of the first slot, and may, based on the indication, transmit a subset of the set of TBs corresponding to a subset of sub-slots of a second slot. In some cases, the subset of TBs may be determined based on a respective parameter associated with each TB of the set of TBs (e.g., priority, quality of service (QoS), or remaining packet delay budget (PDB)). Additionally, or alternatively, to support determining TB s for retransmission, the UE may receive an indication (e.g., a bitmap) including feedback information for each TB of the set of TBs (e.g., transmitted in the first slot). For example, the UE may refrain from retransmitting a TB that has been successfully received (e.g., ACK), may refrain from transmitting a TB with an expired PDB, or both. In some cases, the UE may utilize an available sub-slot reserved in an upcoming slot to repeat a transmission of a TB of the subset of TBs scheduled for retransmission. That is, the UE may transmit a TB corresponding to a NACK in both the available sub-slot and a sub-slot scheduled for the TB. In some other examples, the UE may transmit a new TB (e.g., not included in the first slot) in an available sub-slot.

Aspects of the disclosure are initially described in the context of wireless communications systems. Aspects of the disclosure are further illustrated by and described with reference to resource allocation schemes and process flows. Aspects of the disclosure are further illustrated by and described with reference to apparatus diagrams, system diagrams, and flowcharts that relate to configurable mini-slot retransmissions in sidelink communications.

FIG. 1 illustrates an example of a wireless communications system 100 that supports configurable mini-slot retransmissions in sidelink communications in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support configurable mini-slot retransmissions in sidelink communications as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNB s or gNB s, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and N f may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID), or others). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications via the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating using a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHz to 30 GHz, also known as the centimeter band, or using an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

In some examples of the wireless communications system 100, a UE 115 may receive an indication to retransmit one or more TBs via fractional portions of a slot (e.g., sub-slots, mini-slots, or the like). That is, the UE 115 may transmit, in a first slot, a set TBs corresponding to multiple sub-slots of the first slot, and may, based on the indication, transmit a subset of the set of TBs corresponding to a subset of sub-slots of a second slot. In some cases, the subset of TBs may be determined according to a TB retransmission selection scheme, which may be based on a respective parameter associated with each TB of the set of TBs (e.g., priority, QoS, or remaining PDB). Additionally, or alternatively, to support determining TB s for retransmission, the UE 115 may receive an indication (e.g., a bitmap) including feedback information for each TB of the set of TBs For example, the UE 115 may refrain from retransmitting a TB that has been successfully received (e.g., ACK), may refrain from transmitting a TB with an expired PDB, or both. In some cases, the UE 115 may utilize an available sub-slot reserved in an upcoming slot to repeat a transmission of a TB of the subset of TBs scheduled for retransmission. That is, the UE 115 may transmit a TB corresponding to a NACK in both the available sub-slot and a sub-slot scheduled for the TB. In some other examples, the UE 115 may transmit a new TB (e.g., not included in the first slot) in an available sub-slot.

Figure 2:
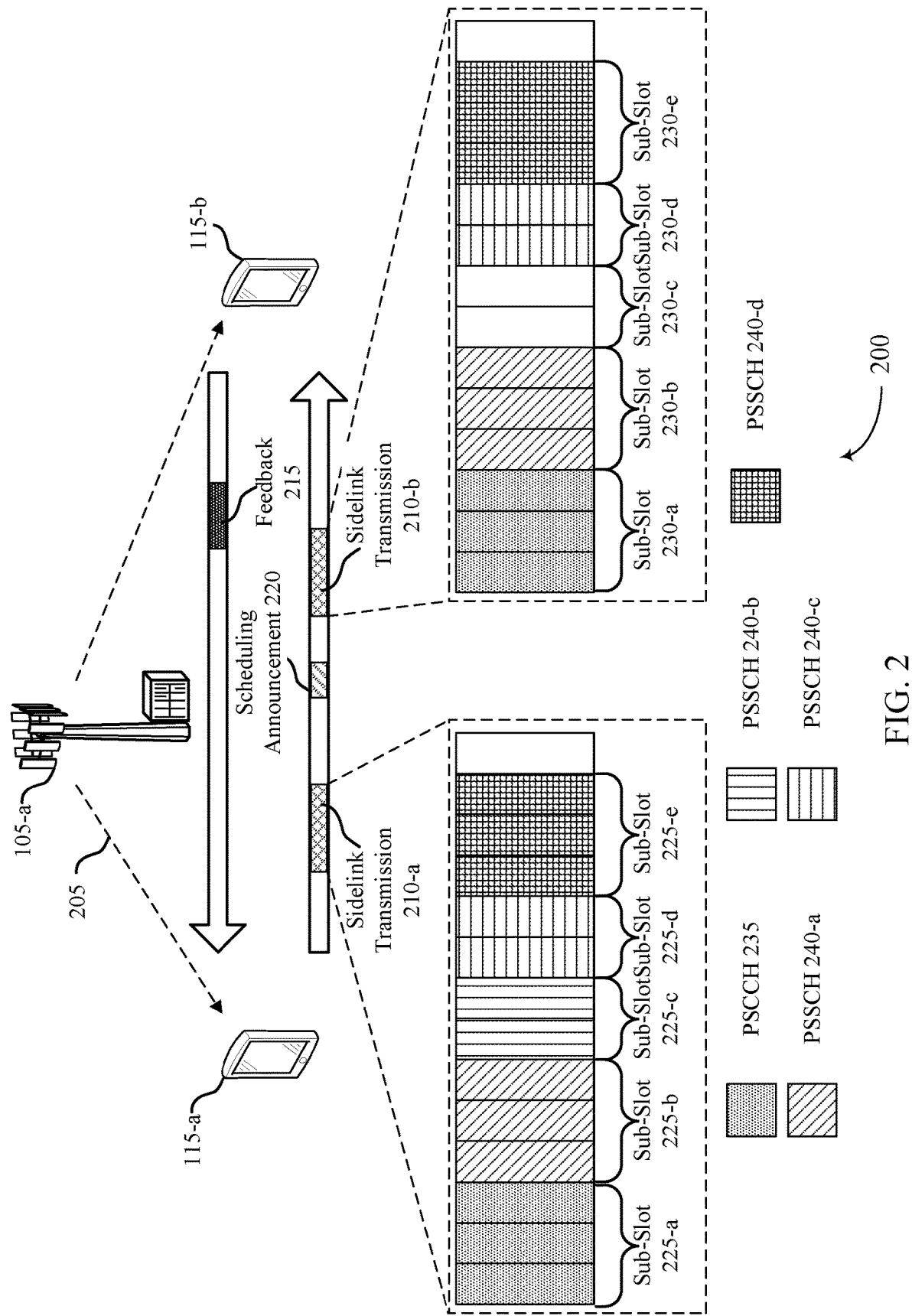
FIG. 2 illustrates an example of a wireless communication system that supports configurable mini-slot retransmissions in sidelink communications in accordance with one or more aspects of the present disclosure.

FIG. 2 illustrates an example of a wireless communications system 200 that supports configurable mini-slot retransmissions in sidelink communications in accordance with one or more aspects of the present disclosure. The wireless communications system 200 may implement one or more aspects of the wireless communications system 100. For example, the wireless communications system may include a network entity 105-a, a UE 115-a, and a UE 115-b, which may be examples of a network entity 105 and UEs 115 as described with reference to FIG. 1. In some cases, the wireless communications system 200 illustrate the UE 115-a and the UE 115-b communicating via sidelink (i.e., without direct scheduling from the network entity 105-a). Such sidelink communications may be performed in a Mode 1 resource allocation scheme or Mode 2 resource allocation scheme. That is, the network entity 105-a may indicate a resource pool allocation for sidelink transmissions via a link 205 (e.g., Mode 1 resource allocation), or the UE 115-a and the UE 115-b may determine available resources for direct communications (e.g., Mode 2 resource allocation).

In some examples, the UE 115-a may be allocated one or more sub-slots (e.g., sub-intervals, mini-slots, fractional portions of a slot, one or more symbol periods) for transmitting sidelink communications. For example, the UE 115-a may transmit a sidelink transmission 210-a via allocated frequency resources (e.g., a subchannel 245) of a first slot (e.g., a time interval that includes a quantity of symbol periods) and may transmit a sidelink transmissions 210-b via allocated frequency resources (e.g., the subchannel 245) of a second slot. In some cases, the sidelink transmission 210-a and the sidelink transmission 210-b may include one or more TBs corresponding to a respective data payload (e.g., a physical sidelink shared channel (PSSCH) payload) and a respective sub-slot 225. That is, each slot may be partitioned into multiple sub-slots according to a pattern (e.g., a length of each sub-slot, a quantity of sub-slots), and may include a gap symbol at an end (e.g., to support beam switching operations). In one example, the sidelink transmission 210-a may transmit a physical sidelink control channel (PSCCH) transmission (e.g., a sidelink control information (SCI) type-1 message) via a sub-slot 225-a, which may indicate a reservation of a quantity of sub-slots of a same slot, one or more future slots, or both. Additionally, or alternatively, a first symbol period of the sub-slot associated with the PSCCH transmission (e.g., the sub-slot 225-a) may include an automatic gain control (AGC) symbol, or may not include an AGC symbol (e.g., if the receiver can set the AGC based on the first symbol of the slot). In some cases, a PSCCH may be transmitted via a first sub-slot of a given slot.

The UE 115-a may be allocated or have reserved multiple sub-slots for sidelink transmissions. For example, in a Mode 1 resource allocation scheme, the UE 115-a may receive a downlink control information (DCI) message from the network entity 105-a allocating sidelink resources for the UE 115-a to transmit one or more TBs. Similarly, in a Mode 2 resource allocation scheme, the UE 115-a may identify and reserve resources for transmitting the one or more TBs. In some cases, each TB may be allocated resources for an initial transmission and up to two retransmissions. For example, an initial transmission of a TB associated with a PSSCH 240-a may be allocated at a sub-slot 225-b (e.g., in the sidelink transmission 210-a), and a retransmission of the TB may be allocated at a sub-slot 230-b (e.g., a corresponding sub-slot in the sidelink transmission 210-b). Similar allocations or reservations of resources may be made for a TB associated with a PSSCH 240-b (e.g., allocated to a sub-slot 225-c and a sub-slot 230-c), a TB associated with a PSSCH 240-c (e.g., allocated to a sub-slot 225-d and a sub-slot 230-d), and a TB associated with a PSSCH 240-d (e.g., allocated to a sub-slot 225-d and a sub-slot 230-d).

In some examples, the UE 115-a may receive a message including feedback 215 from the UE 115-b. The feedback 215 may indicate whether TBs transmitted in the sidelink transmission 210-a were successfully received at the UE 115-b. For example, the UE 115-a may determine, using the feedback 215, that the PSSCH 240-a was unsuccessfully received (e.g., associated with a HARQ-NACK), that the PSSCH 240-*b* was successfully received (e.g., associated with a HARQ-ACK), or both. Accordingly, the UE 115-*a* may perform a retransmission of the PSSCH 240-*a* using resources allocated or reserved for the retransmission (e.g., the sub-slot 230-*b*), but may refrain from retransmitting the PSSCH 240-*b* despite resources being allocated or reserved for the retransmission (e.g., the sub-slot 230-*c*). In such examples, unutilized resources (e.g., resources allocated for retransmission of a successfully-received TB) may be used for transmitting a different TB selected in accordance with a TB retransmission selection scheme.

To support dynamic sub-slot allocation for retransmissions, the network entity 105-*a* may schedule retransmissions (e.g., in a Mode 1 resource allocation scheme) of one or more sub-slots (e.g., a subset of the sub-slots, all of the sub-slots) according to a set of rules associated with properties of the TBs (e.g., the TB retransmission selection scheme). For example, the network entity 105-*a* may determine to schedule a retransmission of a TB based on a priority, a QoS, remaining PDB, or any combination thereof, associated with a TB. In some cases, the network entity 105-*a* may transmit a message (e.g., a DCI message, a media access control control element (MAC CE) message, or a radio resource control (RRC) message) indicating the set of rules to the UE 115-*a*. Additionally, or alternatively, the UE 115-*a* may be preconfigured with the set of rules. The UE 115-*a* may then determine which TBs to retransmit (e.g., in a Mode 2 resource allocation scheme) according to the set of rules. Additionally, or alternatively, the UE 115-*a* may transmit a scheduling announcement 220 prior to transmitting the sidelink transmission 210-*b*. The scheduling announcement 220 may indicate which TB s are to be retransmitted (e.g., based on feedback status or remaining PDB) in the sidelink transmission 210-*b*, and may be received by the network entity 105-*a*, one or more other sidelink UEs 115, or any combination thereof.

In some cases, the UE 115-*a* may determine which TBs of the sidelink transmission 210-*a* to retransmit in the sidelink transmission 210-*b* based on the feedback 215. For example, the UE 115-*b* may transmit the feedback 215 as a bitmap indicating feedback (e.g., a '0' for a NACK and a '1' for an ACK) for each TB. In some examples, the feedback 215 may be transmitted via a Layer-1 message (e.g., an SCI message), a Layer-2 message (e.g., a MAC CE), or a Layer-3 message (e.g., RRC signaling) and may be received by one or more UEs 115 (e.g., the UE 115-*a*) and network entities 105 (e.g., the network entity 105-*a*) connected to the UE 115-*b*. In such cases, the TB retransmission selection scheme may indicate, according to the feedback 215, that the UE 115-*a* is to retransmit TBs associated with a NACK and may refrain from retransmitting TBs associated with an ACK. Additionally, or alternatively, the TB retransmission selection scheme may indicate that the UE 115-*a* is to refrain from retransmitting a TB with an expired PDB regardless of corresponding feedback.

In some cases, unutilized sub-slots may be used for transmissions from one or more other UEs 115. For example, the sub-slot 230-*c* may be allocated for retransmission of a TB that is not to be retransmitted, and may be unutilized. The scheduling announcement 220 may indicate that the sub-slot 230-*c* is available, which may be selected for use by the one or more other UEs 115 according to the TB retransmission selection scheme. In one example, such as in a Mode 1 resource allocation scheme, the TB retransmission selection scheme may indicate that the network entity 105-*a* is to assign the sub-slot 230-*c* to the one or more other UEs 115. In some other examples, such as in a Mode 2 resource allocation scheme, the TB retransmission selection scheme may indicate that a UE 115 of the one or more other UEs 115 is to select the sub-slot 230-*c* for transmissions. Additionally, or alternatively, the TB retransmission selection scheme may indicate that the one or more other UEs 115 are to construct a non-orthogonal multiple access (NOMA) or multi-user multi-in multi-out (MU-MIMO) transmission scheme for the sub-slot 230-*c*.

Figure 3:
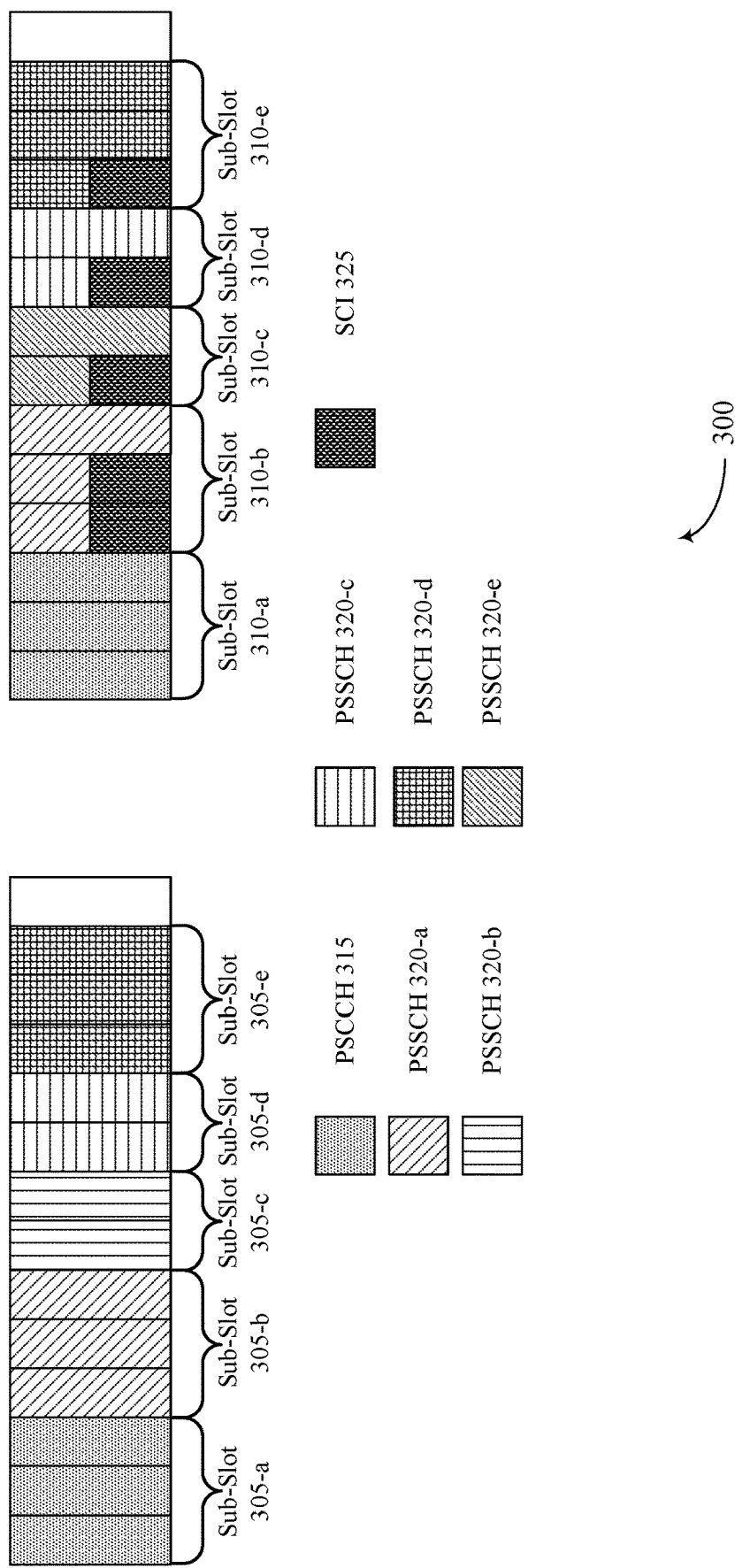
FIG. 3 illustrates an example of a resource allocation scheme that supports configurable mini-slot retransmissions in sidelink communications in accordance with one or more aspects of the present disclosure.

FIG. 3 illustrates an example of a resource allocation scheme 300 that supports configurable mini-slot retransmissions in sidelink communications in accordance with one or more aspects of the present disclosure. The resource allocation scheme 300 may be implemented by one or more aspects of the wireless communications system 200 and the wireless communications system 100. For example, the resource allocation scheme 300 may be an example of an initial transmission of multiple TBs via corresponding sub-slots 305 and a subchannel 330 and a retransmission of one or more of the multiple TBs via corresponding sub-slots 310 and the subchannel 330, which may be examples of the sub-slots 225, the sub-slots 230, and the subchannel 245 as described with reference to FIG. 2. In some cases, the resource allocation scheme may illustrate a UE 115 transmitting a new TB via an unutilized sub-slot 310 in accordance with a TB retransmission selection scheme.

In some cases, a UE 115 may be allocated or have reserved multiple sub-slots for an initial transmission and up to two retransmissions of multiple TBs as described with reference to FIG. 2. That is, the UE 115 may be allocated for an initial transmission of a PSSCH 320-*a* via a sub-slot 305-*b*, a PSSCH 320-*b* via a sub-slot 305-*c*, a PSSCH 320-*c* via a sub-slot 305-*d*, and a PSSCH 320-*d* via a sub-slot 305-*e*, as well as a retransmission of the PSSCH 320-*a* via a sub-slot 310-*b*, the PSSCH 320-*b* via a sub-slot 310-*c*, the PSSCH 320-*c* via a sub-slot 310-*d*, and the PSSCH 320-*d* via a sub-slot 310-*e*. Further, the UE 115 may refrain from retransmitting one or more of the multiple TBs due to receiving feedback for the one or more TBs (e.g., a HARQ-ACK), due to a respective PDB of the one or more TB s being expired, or both. For example, the UE 115 transmit a PSSCH 320-*b* via a sub-slot 305-*c* (e.g., an initial transmission) and may refrain from retransmitting the PSSCH 320-*b* despite the sub-slot 310-*c* being allocated for the retransmission.

In some examples, the UE 115 may determine to utilize the sub-slot 310-*c* for transmission of a new TB according to the TB retransmission selection scheme. For example, the UE 115 may transmit a PSSCH 320-*e* via the sub-slot 310-*c* (e.g., a sub-slot allocated for a retransmission of a TB associated with a HARQ-ACK), which may be an initial transmission of the PSSCH 320-*e* (e.g., not transmitted via a sub-slot 305). To support transmission of the new TB, the UE 115 may indicate the new TB via an SCI 325 (e.g., an SCI-2 message). That is, the UE 115 may include the SCI 325 in each retransmission occasion (e.g., the sub-slots 310) to indicate a new data indicator (NDI), a HARQ-ID, or both associated with the PSSCH 320-*e*.

Figure 4:
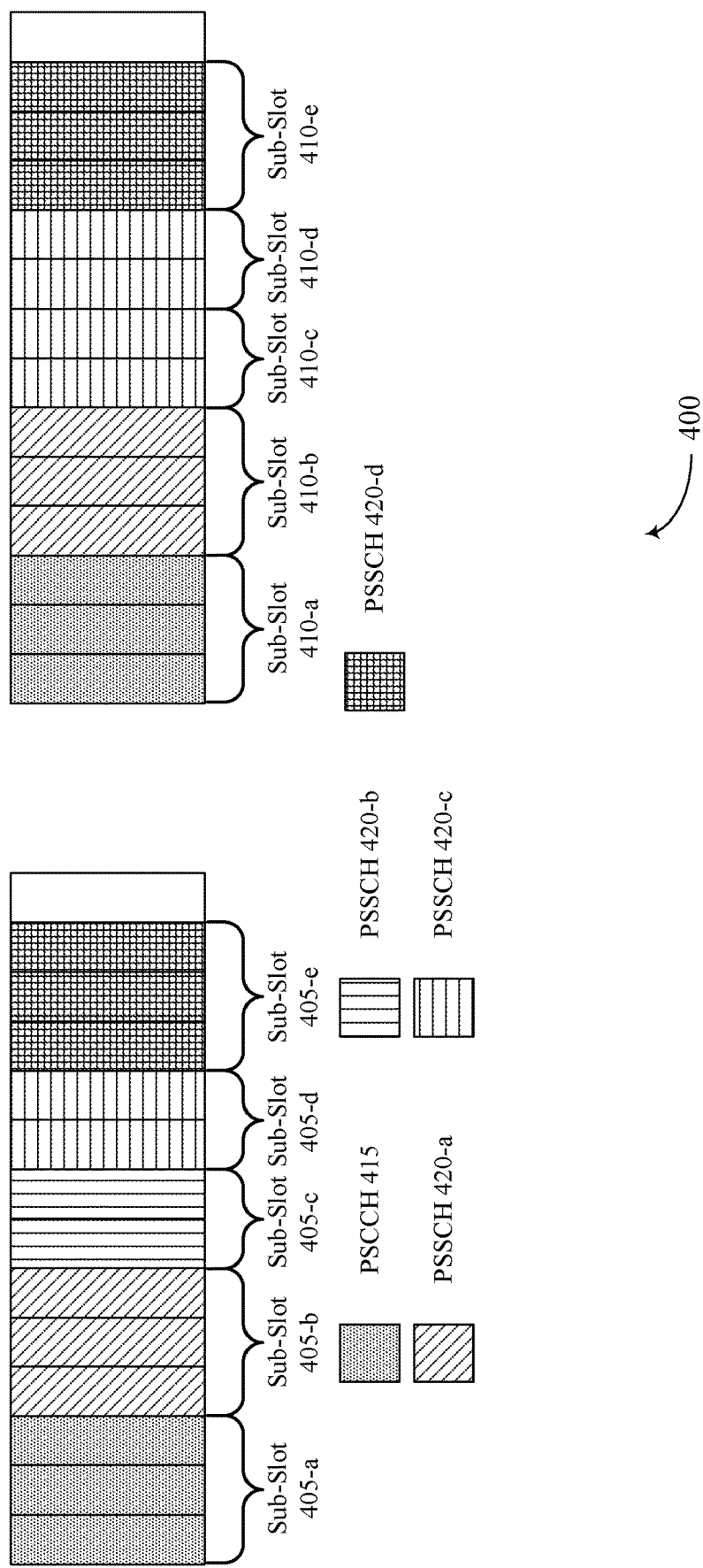
FIG. 4 illustrates an example of a resource allocation scheme that supports configurable mini-slot retransmissions in sidelink communications in accordance with one or more aspects of the present disclosure.

FIG. 4 illustrates an example of a resource allocation scheme 400 that supports configurable mini-slot retransmissions in sidelink communications in accordance with one or more aspects of the present disclosure. The resource allocation scheme 400 may be implemented by one or more aspects of the wireless communications system 200 and the wireless communications system 100. For example, the resource allocation scheme 400 may be an example of an initial transmission of multiple TBs via corresponding sub-slots 405 and a subchannel 425 and a retransmission of one or more of the multiple TBs via corresponding sub-slots 410 and the subchannel 425, which may be examples of the sub-slots 225, the sub-slots 230, and the subchannel 245 as described with reference to FIG. 2. In some cases, the resource allocation scheme 400 may be an example of a UE 115 transmitting a repetition of a TB via an unutilized sub-slot 410-*c*.

In some cases, a UE 115 may be allocated or have reserved multiple sub-slots for an initial transmission and up to two retransmissions of multiple TBs as described with reference to FIG. 2. That is, the UE 115 may be allocated for an initial transmission of a PSSCH 420-*a* via a sub-slot 405-*b*, a PSSCH 420-*b* via a sub-slot 405-*c*, a PSSCH 420-*c* via a sub-slot 405-*d*, and a PSSCH 420-*d* via a sub-slot 405-*e*, as well as a retransmission of the PSSCH 420-*a* via a sub-slot 410-*b*, the PSSCH 420-*b* via a sub-slot 410-*c*, the PSSCH 420-*c* via a sub-slot 410-*d*, and the PSSCH 420-*d* via a sub-slot 410-*e*. Further, the UE 115 may refrain from retransmitting one or more of the multiple TBs due to receiving feedback for the one or more TBs (e.g., a HARQ-ACK), due to a respective PDB of the one or more TB s being expired, or both. For example, the UE 115 transmit a PSSCH 420-*b* via a sub-slot 405-*c* (e.g., an initial transmission) and may refrain from retransmitting the PSSCH 420-*b* despite the sub-slot 410-*c* being allocated for the retransmission.

In some examples, the UE 115 may determine to utilize the sub-slot 410-*c* (e.g., a sub-slot allocated for a retransmission of a TB associated with a HARQ-ACK) for repeating a transmission of a previously transmitted TB. For example, the UE 115 may retransmit the PSSCH 420-*c*, which may be associated with an initial transmission of a TB that received a HARQ-NACK, via both the sub-slot 410-*c* (e.g., the unutilized sub-slot) and the sub-slot 410-*d* (e.g., the sub-slot allocated for retransmission). The UE 115 may determine which TB (e.g., from a set of TBs associated with HARQ-NACKs) to repeat according to the TB retransmission selection scheme. In some cases, the TB retransmission selection scheme may indicate to repeat a retransmission of a TB with a priority, QoS, or both that is greater than or equal to a priority, QoS, or both of a TB associated with the unutilized sub-slot. For instance, the PSSCH 420-*c* may be selected for repetition due to the PSSCH 420-*c* having a priority, QoS, or both that is greater than or equal to a priority, QoS, or both of the PSSCH 420-*b*. In such an example, the repeated retransmission of the PSSCH 420-*c* (e.g., via the sub-slot 410-*c*) may be transmitted according to a same redundancy version as the PSSCH 420-*b*, or may be transmitted according to a different redundancy version as the PSSCH 420-*b*. In some examples, the PSSCH 420-*c* may be transmitted according to a lower coding rate as the PSSCH 420-*b*. That is, the UE 115 may transmit the PSSCH 420-*c* via the sub-slot 410-*c* and the sub-slot 410-*d* at different coding rates.

In some cases, such a condition may be satisfied by multiple TBs. As an example, the PSSCH 420-*a* and the PSSCH 420-*c* may each have a priority, QoS, or both that is greater than or equal to the priority, QoS, or both of the PSSCH 420-*b*, and the UE 115 may select a TB for repetition based on a remaining PDB of the PSSCH 420-*a* and the PSSCH 420-*c*. That is, the UE 115 may repeat the PSSCH 420-*c* due to the PSSCH 420-*c* having a lower remaining PDB than the PSSCH 420-*a*. In some cases, such as when multiple TBs satisfy the priority or QoS condition as well as have a same remaining PDB, the UE 115 may repeat the TB with a similar payload size or similar resources as the TB associated with the unutilized sub-slot (e.g., the PSSCH 420-*b* associated with a TB that received a HARQ-ACK). For example, the UE 115 may repeat the PSSCH 420-*c* due to the PSSCH 420-*c* including a similar payload size, a similar quantity of symbol periods as the PSSCH 420-*b*, or both. That is, the UE 115 may prioritize repetition of a TB having a same quantity or smaller quantity of symbol periods as the TB associated with the unutilized sub-slot (e.g., to avoid a partial transmission of the repeated TB).

Figure 5:
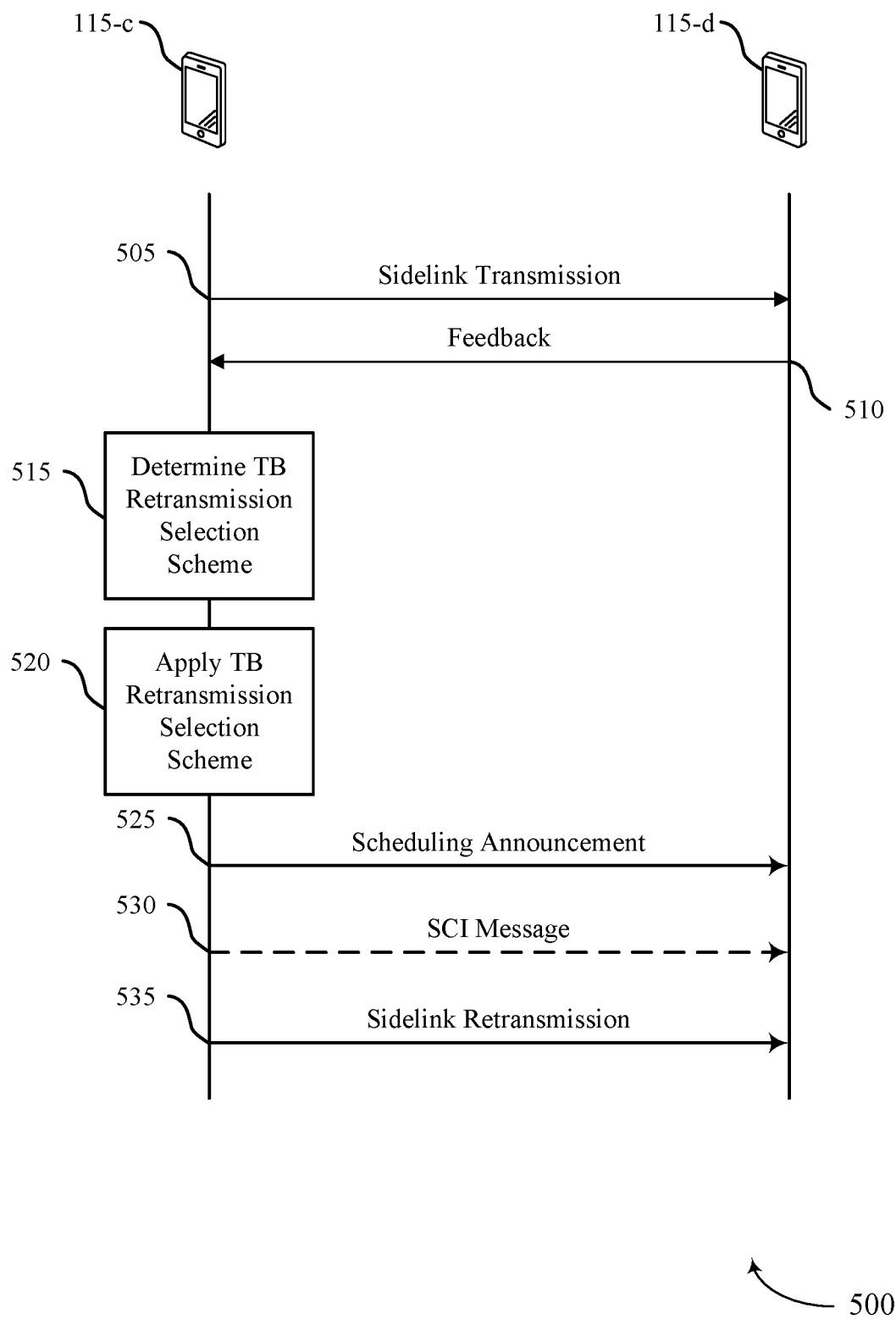
FIG. 5 illustrates an example of a process flow that supports configurable mini-slot retransmissions in sidelink communications in accordance with one or more aspects of the present disclosure.

The UE 115 may determine whether to use an unutilized resource for transmission of a new TB or repetition of a previously transmitted TB (e.g., the TB retransmission selection scheme) based on network coordination. In some cases, a network entity 105 may configure a resource pool to indicate the TB retransmission selection scheme, or may allow for the UE 115 to select the TB retransmission selection scheme (e.g., an allowed feature). Additionally, or alternatively, the UE 115 may communicate with other UEs 115 via an RRC connection or using Layer-1, Layer-2, or Layer-3 indications to determine the TB retransmission selection scheme FIG. 5 illustrates an example of a process flow 500 that supports configurable mini-slot retransmissions in sidelink communications in accordance with one or more aspects of the present disclosure. The process flow 500 may implement aspects of the wireless communications system 200 and the wireless communications system 100. For example, the process flow 500 may include a UE 115-*c* and a UE 115-*d*, which may be examples of sidelink UEs 115 communicating initial transmissions and retransmissions of multiple TBs, as described with reference to FIG. 2. Alternative examples of the following may be implemented, where some processes are performed in a different order than described or are not performed. In some cases, processes may include additional features not mentioned below, or further processes may be added.

At 505, the UE 115-*c* may transmit and the UE 115-*d* may receive a sidelink transmission. The sidelink transmission may include multiple TBs corresponding to multiple sub-slots (e.g., sub-intervals) of a slot (e.g., a time interval).

At 510, the UE 115-*d* may transmit and the UE 115-*c* may receive a feedback indication corresponding to the sidelink transmission. The feedback indication may include a bitmap which provides feedback for each of the multiple TBs. For example, using the feedback indication, the UE 115-*c* may determine which TBs were successfully received (e.g., are not to be retransmitted) and which TBs were unsuccessfully received (e.g., are to be retransmitted). In some cases, the UE 115-*c* may refrain from retransmitting a TB that has been unsuccessfully received if a PDB of the TB has expired.

At 515, the UE 115-*c* may determine a TB retransmission selection scheme. In some cases, the TB retransmission selection scheme may be configured per-resource pool by a network entity 105. In such an example, the UE 115-*c* may receive a message indicating the configuration, which may be received via RRC signaling, a Layer-1 message, a Layer-2 message, a Layer-3 message, or any combination thereof. In some other cases, the UE 115-*c* and the UE 115-*d* may communicate (e.g., via RRC connect, a Layer-1 message, a Layer-2 message, a Layer-3 message, or any combination thereof) to determine a TB retransmission selection scheme. Further, the UE 115-*c* may determine which TBs to retransmit using the TB retransmission selection scheme as well as the feedback indication. The TB retransmission selection scheme may indicate which TBs of a first sidelink transmission in a first slot (e.g., a first time interval) are to be retransmitted via allocated sub-slots (e.g., sub-intervals) of a second slot (e.g., a second time interval).

In some cases, the TB retransmission selection scheme may indicate a set of rules for determining which TBs to retransmit (e.g., TBs available for retransmission according to the feedback). For example, the TB retransmission selection scheme may indicate to retransmit a first TB based on a priority associated with the first TB, a QoS associated with the first TB, a remaining PDB for the first TB, a size of a payload associated with the first TB, a quantity of time-frequency resources associated with the first TB, or any combination thereof. Additionally, or alternatively, the TB retransmission selection scheme may indicate to refrain from retransmitting a second TB of the plurality of sidelink TBs PDB for the second sidelink TB expiring.

At 520 the UE 115-c may apply the TB retransmission selection scheme for an upcoming sidelink transmission (e.g., a retransmission). For example, the UE 115-c may identify which TB s are available for retransmission (e.g., according to network entity 105 scheduling, feedback information, the set of rules, or any combination thereof), and may further select a TB retransmission pattern. That is, if multiple TBs are available to be retransmitted via an unutilized sub-slot, the UE 115-c may determine the TB retransmission pattern according to the resource pool configuration and parameters associated with the multiple TBs.

In some cases, the UE 115-c may determine to transmit a new TB via an unutilized sub-slot, which may be based on the resource pool configuration. Additionally, or alternatively, the UE 115-c may determine to transmit a repetition of a TB via the unutilized sub-slot. If multiple TBs are available for retransmission, the UE 115-c may first compare a priority and QoS of the TBs, then a remaining PDB of the TBs given a similar priority or QoS, followed by a payload size or resources for the TBs given a similar remaining PDB. If the TB s are similar for each prior condition, the UE 115-c may transmit a TB having resources similar to the TB associated with the unutilized sub-slot (e.g., a similar payload size, a similar quantity of symbol periods, or the like).

At 525, the UE 115-c may transmit and the UE 115-d may receive a scheduling announcement. The scheduling announcement may be an indication that a subset of sub-slots for an upcoming slot (e.g., a second time interval) are scheduled for retransmission. In some cases, the scheduling announcement may indicate the transmission pattern determine by the UE 115-c based on the TB retransmission selection scheme. Additionally, the UE 115-c may transmit the scheduling announcement to a network entity 105.

At 530, the UE 115-c may transmit and the UE 115-d may receive an SCI message associated with a new TB. For example, when the UE 115-c determines to transmit a new TB via an unutilized sub-slot, the UE 115-c may indicate the new TB via an NDI, a HARQ-ID, or both included in the SCI message. In some cases, the SCI message may be an SCI-2 message, and may include the HARQ process ID, the NDI, a source ID, a destination ID, a CSI report trigger, or any combination thereof. Further, in a groupcast option (e.g., NACK distance-based feedback), the SCI-2 message may include a zone ID indicating a location of the transmitter and a maximum communication rage for feedback transmissions. In some cases, the SCI message may be included in each retransmission occasion.

At 535, the UE 115-c may transmit and the UE 115-d may receive a sidelink retransmission. The UE 115-c may transmit the sidelink retransmissions according to the TB retransmission selections scheme. That is, the UE 115-d may transmit multiple TBs, which may include retransmissions of TBs, repetition of a retransmitted TB via multiple sub-slots, transmission of a new TB, or any combination thereof.

In some cases, such as when a TB is repeated in multiple sub-slots, the TB may be transmitted at differing coding rates between the multiple sub-slots.

Figure 6:
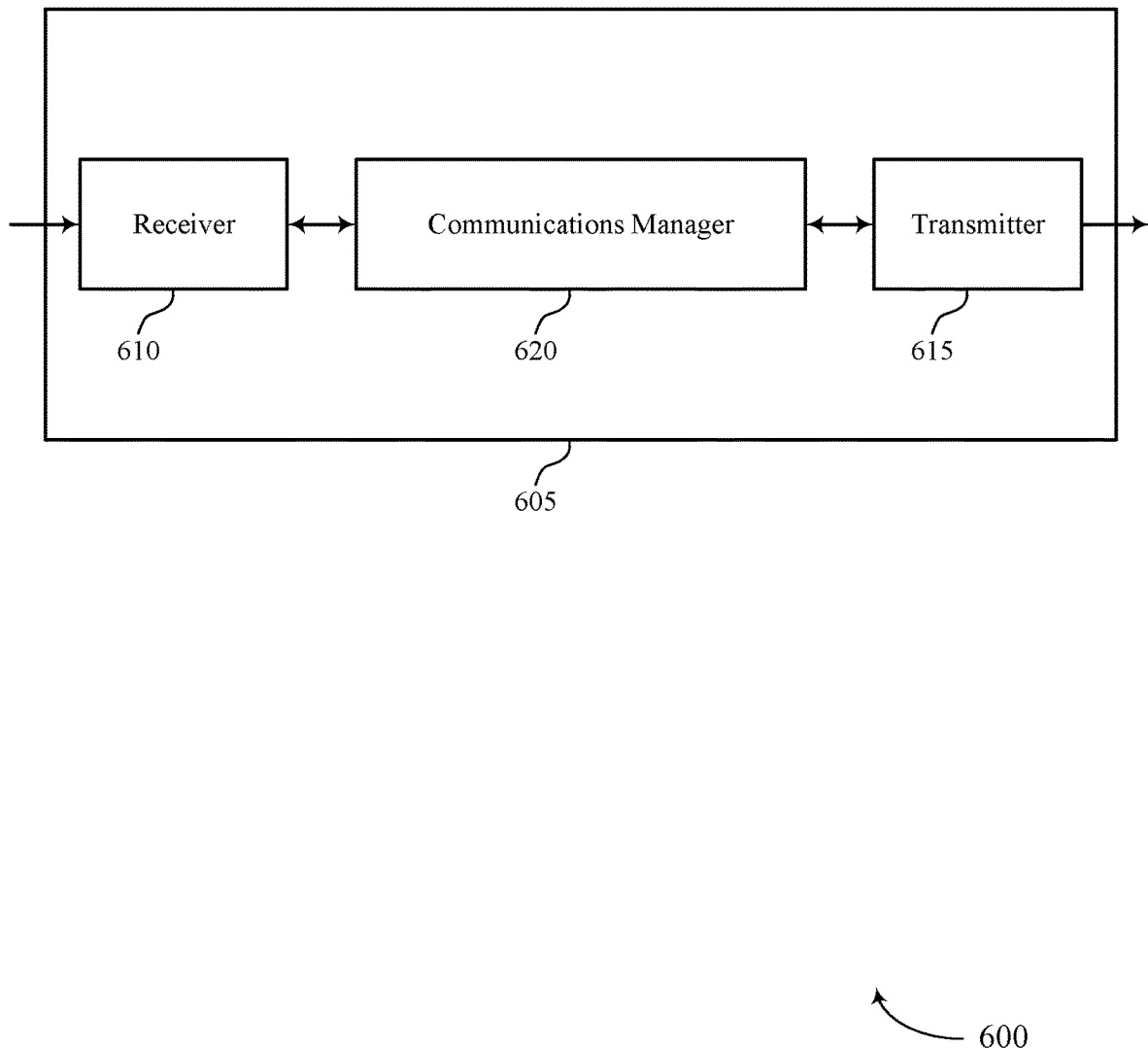
FIGS. 6 and 7 show block diagrams of devices that support configurable mini-slot retransmissions in sidelink communications in accordance with one or more aspects of the present disclosure.

FIG. 6 shows a block diagram 600 of a device 605 that supports configurable mini-slot retransmissions in sidelink communications in accordance with one or more aspects of the present disclosure. The device 605 may be an example of aspects of a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to configurable mini-slot retransmissions in sidelink communications). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to configurable mini-slot retransmissions in sidelink communications). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of configurable mini-slot retransmissions in sidelink communications as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 620 may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communication at a UE in accordance with examples as disclosed herein. For example, the communications manager 620 may be configured as or otherwise support a means for transmitting, via sidelink, a set of multiple sidelink TBs in a set of multiple sub-intervals of a first time interval. The communications manager 620 may be configured as or otherwise support a means for communicating an indication that a subset of sub-intervals of a second time interval are scheduled for retransmission, the second time interval occurring after the first time interval. The communications manager 620 may be configured as or otherwise support a means for transmitting a first sidelink TB of the set of multiple sidelink TB s via a first sub-interval of the subset of sub-intervals of the second time interval in accordance with a TB retransmission selection scheme, where the TB retransmission selection scheme indicates to select the first sidelink TB for retransmission in the first sub-interval based on a parameter associated with the first sidelink TB.

Additionally, or alternatively, the communications manager 620 may support wireless communication at a UE in accordance with examples as disclosed herein. For example, the communications manager 620 may be configured as or otherwise support a means for receiving, via sidelink, a set of multiple sidelink TBs in a set of multiple sub-intervals of a first time interval. The communications manager 620 may be configured as or otherwise support a means for receiving an indication that a subset of sub-intervals of a second time interval are scheduled for retransmission, the second time interval occurring after the first time interval. The communications manager 620 may be configured as or otherwise support a means for monitoring for a first sidelink TB of the set of multiple sidelink TB s via a first sub-interval of the subset of sub-intervals of the second time interval in accordance with a TB retransmission selection scheme, where the TB retransmission selection scheme indicates the first sidelink TB is selected for retransmission in the first sub-interval based on a parameter associated with the first sidelink TB.

By including or configuring the communications manager 620 in accordance with examples as described herein, the device 605 (e.g., a processor controlling or otherwise coupled with the receiver 610, the transmitter 615, the communications manager 620, or a combination thereof) may support techniques for improved sidelink resource usage and reduced sidelink communication latency, which may improve power consumption, user experience, and robustness of a sidelink channel.

Figure 7:
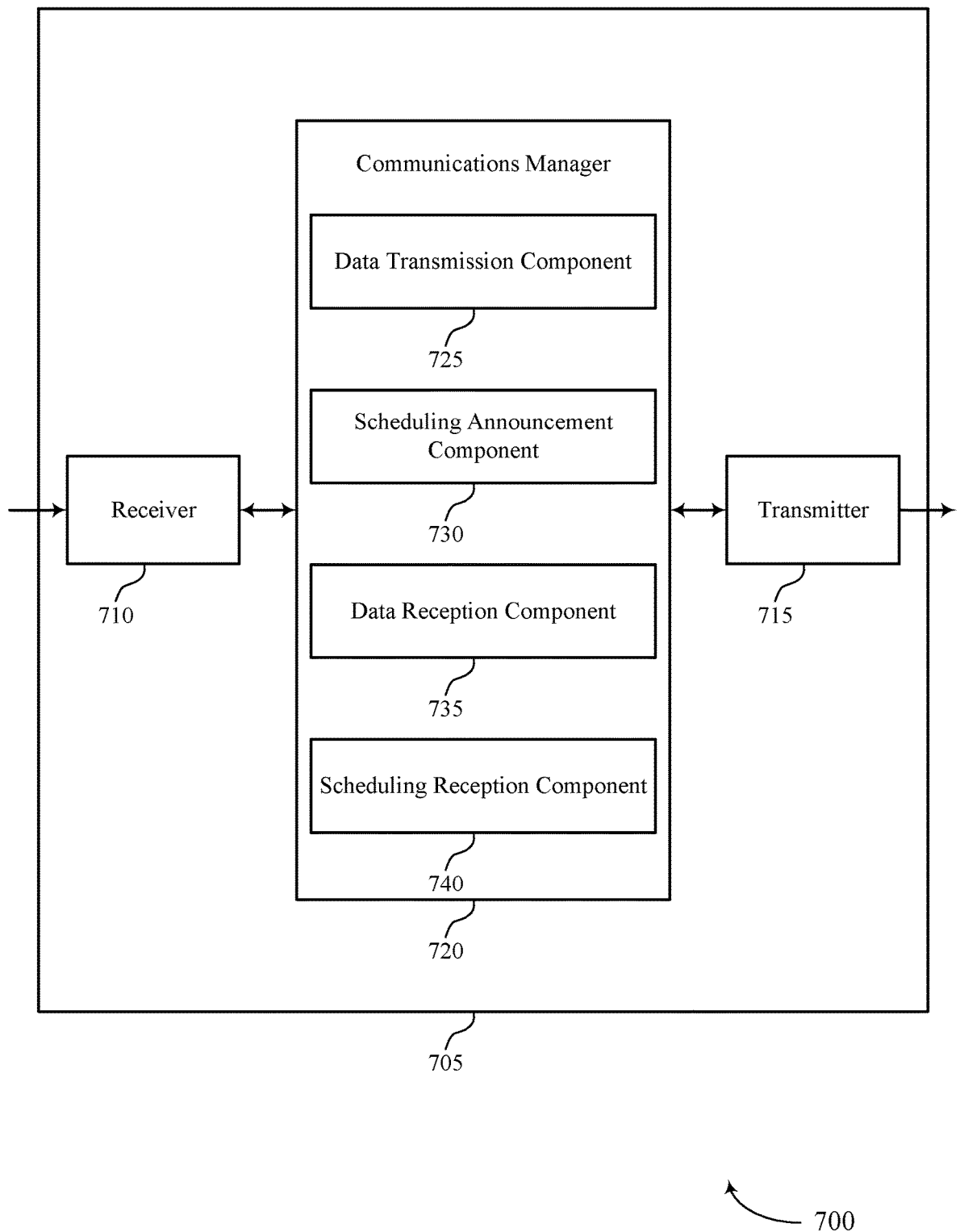

FIG. 7 shows a block diagram 700 of a device 705 that supports configurable mini-slot retransmissions in sidelink communications in accordance with one or more aspects of the present disclosure. The device 705 may be an example of aspects of a device 605 or a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to configurable mini-slot retransmissions in sidelink communications). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to configurable mini-slot retransmissions in sidelink communications). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of configurable mini-slot retransmissions in sidelink communications as described herein. For example, the communications manager 720 may include a data transmission component 725, a scheduling announcement component 730, a data reception component 735, a scheduling reception component 740, or any combination thereof. The communications manager 720 may be an example of aspects of a communications manager 620 as described herein. In some examples, the communications manager 720, or various components thereof, may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communication at a UE in accordance with examples as disclosed herein. The data transmission component 725 may be configured as or otherwise support a means for transmitting, via sidelink, a set of multiple sidelink TB s in a set of multiple sub-intervals of a first time interval. The scheduling announcement component 730 may be configured as or otherwise support a means for communicating an indication that a subset of sub-intervals of a second time interval are scheduled for retransmission, the second time interval occurring after the first time interval. The data transmission component 725 may be configured as or otherwise support a means for transmitting a first sidelink TB of the set of multiple sidelink TB s via a first sub-interval of the subset of sub-intervals of the second time interval in accordance with a TB retransmission selection scheme, where the TB retransmission selection scheme indicates to select the first sidelink TB for retransmission in the first sub-interval based on a parameter associated with the first sidelink TB.

Additionally, or alternatively, the communications manager 720 may support wireless communication at a UE in accordance with examples as disclosed herein. The data reception component 735 may be configured as or otherwise support a means for receiving, via sidelink, a set of multiple sidelink TBs in a set of multiple sub-intervals of a first time interval. The scheduling reception component 740 may be configured as or otherwise support a means for receiving an indication that a subset of sub-intervals of a second time interval are scheduled for retransmission, the second time interval occurring after the first time interval. The data reception component 735 may be configured as or otherwise support a means for monitoring for a first sidelink TB of the set of multiple sidelink TBs via a first sub-interval of the subset of sub-intervals of the second time interval in accordance with a TB retransmission selection scheme, where the TB retransmission selection scheme indicates the first sidelink TB is selected for retransmission in the first sub-interval based on a parameter associated with the first sidelink TB.

Figure 8:
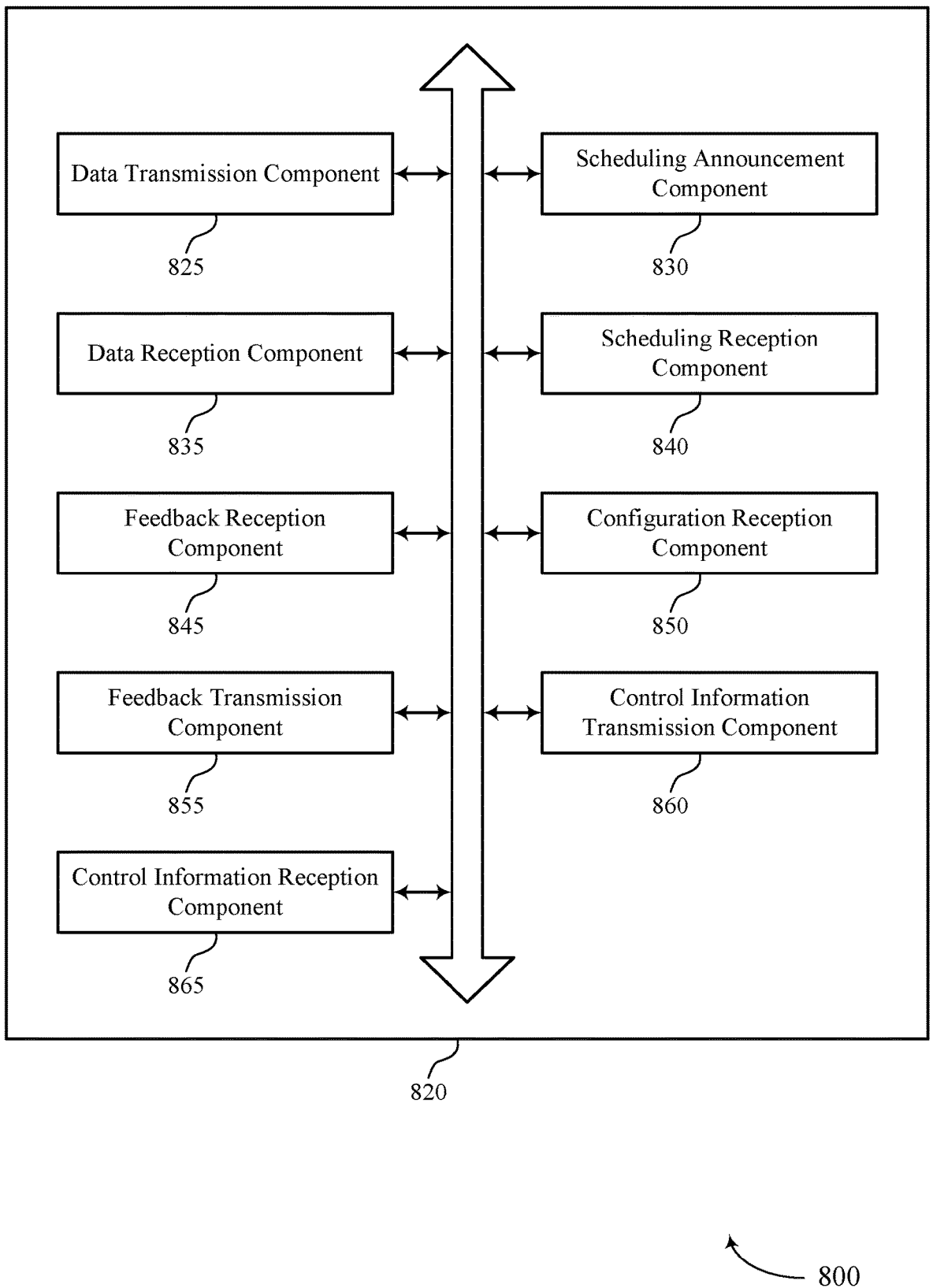
FIG. 8 shows a block diagram of a communications manager that supports configurable mini-slot retransmissions in sidelink communications in accordance with one or more aspects of the present disclosure.

FIG. 8 shows a block diagram 800 of a communications manager 820 that supports configurable mini-slot retransmissions in sidelink communications in accordance with one or more aspects of the present disclosure. The communications manager 820 may be an example of aspects of a communications manager 620, a communications manager 720, or both, as described herein. The communications manager 820, or various components thereof, may be an example of means for performing various aspects of configurable mini-slot retransmissions in sidelink communications as described herein. For example, the communications manager 820 may include a data transmission component 825, a scheduling announcement component 830, a data reception component 835, a scheduling reception component 840, a feedback reception component 845, a configuration reception component 850, a feedback transmission component 855, a control information transmission component 860, a control information reception component 865, or any combination thereof. Each of these components may communicate, directly or indirectly, with one another (e.g., via one or more buses).

The communications manager 820 may support wireless communication at a UE in accordance with examples as disclosed herein. The data transmission component 825 may be configured as or otherwise support a means for transmitting, via sidelink, a set of multiple sidelink transport blocks in a set of multiple sub-intervals of a first time interval. The scheduling announcement component 830 may be configured as or otherwise support a means for communicating an indication that a subset of sub-intervals of a second time interval are scheduled for retransmission, the second time interval occurring after the first time interval. In some examples, the data transmission component 825 may be configured as or otherwise support a means for transmitting a first sidelink transport block of the set of multiple sidelink transport blocks via a first sub-interval of the subset of sub-intervals of the second time interval in accordance with a transport block retransmission selection scheme, where the transport block retransmission selection scheme indicates to select the first sidelink transport block for retransmission in the first sub-interval based on a parameter associated with the first sidelink transport block.

In some examples, the feedback reception component 845 may be configured as or otherwise support a means for receiving, from at least one other UE, a bitmap including feedback information for the set of multiple sidelink transport blocks, where communicating the indication that the subset of sub-intervals of the second time interval are scheduled for retransmission is based on receiving the bitmap.

In some examples, the feedback reception component 845 may be configured as or otherwise support a means for receiving a negative acknowledgment for a second sidelink transport block of the set of multiple sidelink transport blocks communicated via a sub-interval of the first time interval. In some examples, the data transmission component 825 may be configured as or otherwise support a means for transmitting, in accordance with the transport block retransmission selection scheme, the first sidelink transport block via the first sub-interval based on receiving the negative acknowledgment, where the first sub-interval corresponds to the sub-interval for the first time interval and the first sidelink transport block is a retransmission of the second sidelink transport block.

In some examples, the feedback reception component 845 may be configured as or otherwise support a means for receiving an acknowledgement for a second sidelink transport block communicated via a sub-interval of the first time interval. In some examples, the data transmission component 825 may be configured as or otherwise support a means for transmitting a third sidelink transport block via a second sub-interval of the subset of sub-intervals of the second time interval that corresponds to the sub-interval of the first time interval, where the third sidelink transport block is different than the second sidelink transport block.

In some examples, the control information transmission component 860 may be configured as or otherwise support a means for transmitting a sidelink control information message including a new data indicator, a hybrid automatic repeat request identifier, or both, associated with the third sidelink transport block.

In some examples, the feedback reception component 845 may be configured as or otherwise support a means for receiving an acknowledgement for a second sidelink transport block communicated via a sub-interval of the first time interval. In some examples, the data transmission component 825 may be configured as or otherwise support a means for transmitting, in accordance with the transport block retransmission selection scheme, the first sidelink transport block via the first sub-interval and a second sub-interval of the subset of sub-intervals of the second time interval, the second sub-interval corresponding to the sub-interval of the first time interval.

In some examples, the data transmission component 825 may be configured as or otherwise support a means for transmitting the first sidelink transport block via the first sub-interval according to a first channel coding rate. In some examples, the data transmission component 825 may be configured as or otherwise support a means for transmitting the first sidelink transport block via the second sub-interval according to a second channel coding rate that differs from the first channel coding rate.

In some examples, transmitting the first sidelink transport block via the first sub-interval and the second sub-interval is based on a first priority, a first quality service, or both associated with the first sidelink transport block being equal to or higher than a second priority, a second quality of service, or both associated with the second sidelink transport block.

In some examples, transmitting the first sidelink transport block via the first sub-interval and the second sub-interval is based on a first remaining packet delay budget associated with the first sidelink transport block being lower than a second remaining packet delay budget associated with a third sidelink transport block of the set of multiple sidelink transport blocks.

In some examples, transmitting the first sidelink transport block via the first sub-interval and the second sub-interval is based on one or more resources associated with the first sidelink transport block overlapping with one or more resources associated with the second sidelink transport block.

In some examples, the transport block retransmission selection scheme indicates to refrain from retransmitting a second sidelink transport block of the set of multiple sidelink transport blocks based on a packet delay budget for the second sidelink transport block expiring.

In some examples, the parameter associated with the first sidelink transport block includes a priority associated with the first sidelink transport block, a quality of service associated with the first sidelink transport block, a remaining packet delay budget for the first sidelink transport block, a size of a payload associated with the first sidelink transport block, a quantity of time-frequency resources associated with the first sidelink transport block, or any combination thereof.

In some examples, the configuration reception component 850 may be configured as or otherwise support a means for receiving a message indicating a configuration for a resource pool for at least the first time interval and the second time interval, where the transport block retransmission selection scheme is based on the configuration.

In some examples, the message is received via a Layer-1 message, a Layer-2 message, or a Layer-3 message.

In some examples, the first time interval includes a slot and the set of multiple sub-intervals include a set of multiple sub-slots.

Additionally, or alternatively, the communications manager 820 may support wireless communication at a UE in accordance with examples as disclosed herein. The data reception component 835 may be configured as or otherwise support a means for receiving, via sidelink, a set of multiple sidelink transport blocks in a set of multiple sub-intervals of a first time interval. The scheduling reception component 840 may be configured as or otherwise support a means for receiving an indication that a subset of sub-intervals of a second time interval are scheduled for retransmission, the second time interval occurring after the first time interval. In some examples, the data reception component 835 may be configured as or otherwise support a means for monitoring for a first sidelink transport block of the set of multiple sidelink transport blocks via a first sub-interval of the subset of sub-intervals of the second time interval in accordance with a transport block retransmission selection scheme, where the transport block retransmission selection scheme indicates the first sidelink transport block is selected for retransmission in the first sub-interval based on a parameter associated with the first sidelink transport block.

In some examples, the feedback transmission component 855 may be configured as or otherwise support a means for transmitting, to at least one other UE, a bitmap including feedback information for the set of multiple sidelink transport blocks, where receiving the indication that the subset of sub-intervals of the second time interval are scheduled for retransmission is based on transmitting the bitmap.

In some examples, the feedback transmission component 855 may be configured as or otherwise support a means for transmitting a negative acknowledgment for a second sidelink transport block of the set of multiple sidelink transport blocks communicated via a sub-interval of the first time interval. In some examples, the data reception component 835 may be configured as or otherwise support a means for receiving, in accordance with the transport block retransmission selection scheme, the first sidelink transport block via the first sub-interval based on receiving the negative acknowledgment, where the first sub-interval corresponds to the sub-interval for the first time interval and the first sidelink transport block is a retransmission of the second sidelink transport block.

In some examples, the feedback transmission component 855 may be configured as or otherwise support a means for transmitting an acknowledgement for a second sidelink transport block communicated via a sub-interval of the first time interval. In some examples, the data reception component 835 may be configured as or otherwise support a means for receiving a third sidelink transport block via a second sub-interval of the subset of sub-intervals of the second time interval that corresponds to the sub-interval of the first time interval, where the third sidelink transport block is different than the second sidelink transport block.

In some examples, the control information reception component 865 may be configured as or otherwise support a means for receiving a sidelink control information message including a new data indicator, a hybrid automatic repeat request identifier, or both, associated with the third sidelink transport block.

In some examples, the feedback transmission component 855 may be configured as or otherwise support a means for transmitting an acknowledgement for a second sidelink transport block communicated via a sub-interval of the first time interval. In some examples, the data reception component 835 may be configured as or otherwise support a means for receiving, in accordance with the transport block retransmission selection scheme, the first sidelink transport block via the first sub-interval and a second sub-interval of the subset of sub-intervals of the second time interval, the second sub-interval corresponding to the sub-interval of the first time interval.

In some examples, the data reception component 835 may be configured as or otherwise support a means for receiving the first sidelink transport block via the first sub-interval according to a first channel coding rate. In some examples, the data reception component 835 may be configured as or otherwise support a means for receiving the first sidelink transport block via the second sub-interval according to a second channel coding rate that differs from the first channel coding rate.

In some examples, receiving the first sidelink transport block via the first sub-interval and the second sub-interval is based on a first priority, a first quality service, or both associated with the first sidelink transport block being equal to or higher than a second priority, a second quality of service, or both associated with the second sidelink transport block.

In some examples, receiving the first sidelink transport block via the first sub-interval and the second sub-interval is based on a first remaining packet delay budget associated with the first sidelink transport block being lower than a second remaining packet delay budget associated with a third sidelink transport block of the set of multiple sidelink transport blocks.

In some examples, receiving the first sidelink transport block via the first sub-interval and the second sub-interval is based on one or more resources associated with the first sidelink transport block overlapping with one or more resources associated with the second sidelink transport block.

In some examples, the parameter associated with the first sidelink transport block includes a priority associated with the first sidelink transport block, a quality of service associated with the first sidelink transport block, a remaining packet delay budget for the first sidelink transport block, a size of a payload associated with the first sidelink transport block, a quantity of time-frequency resources associated with the first sidelink transport block, or any combination thereof.

In some examples, the configuration reception component 850 may be configured as or otherwise support a means for receiving a message indicating a configuration for a resource pool including at least the first time interval and the second time interval, where the transport block retransmission selection scheme is based on the configuration.

In some examples, the message is received via a Layer-1 message, a Layer-2 message, or a Layer-3 message.

Figure 9:
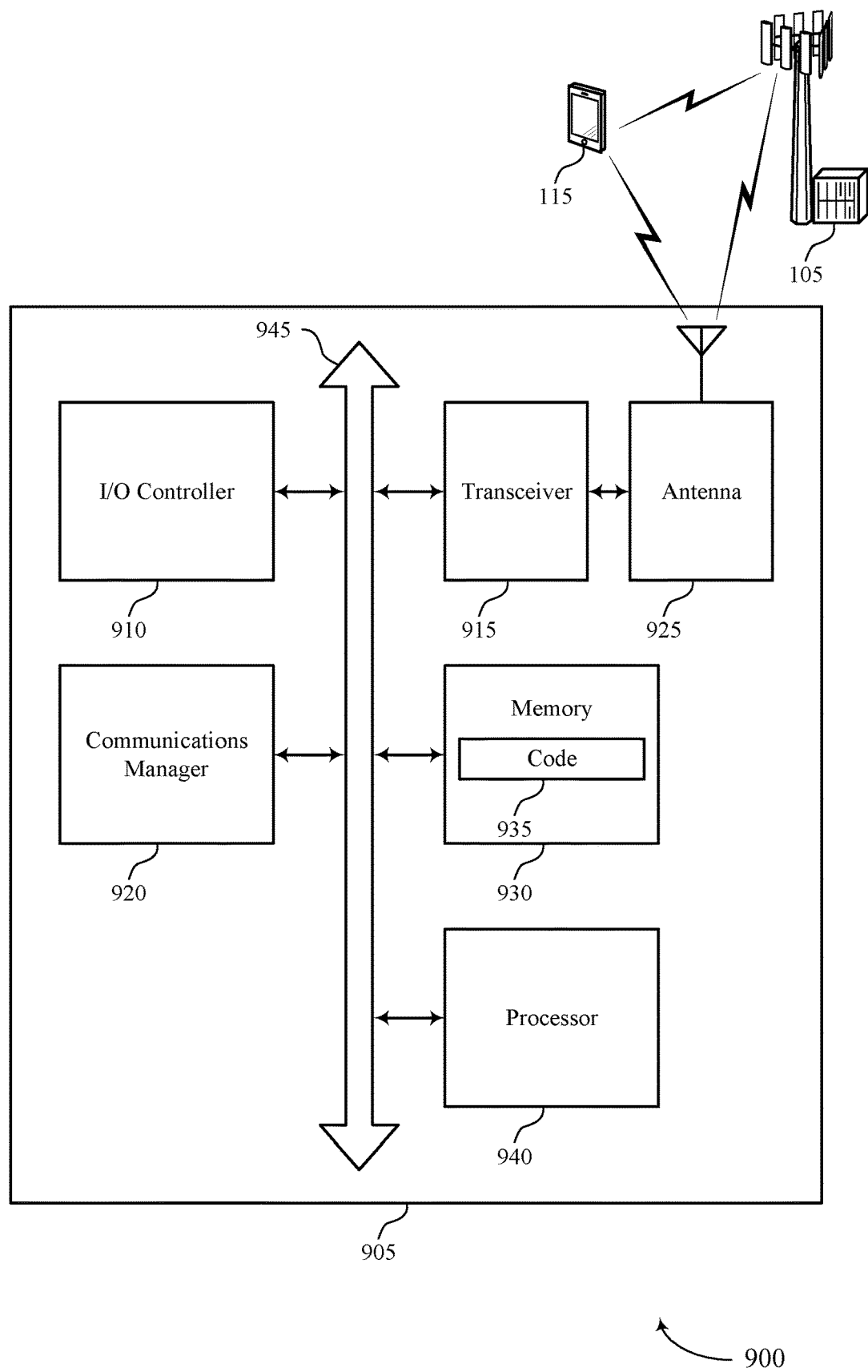
FIG. 9 shows a diagram of a system including a device that supports configurable mini-slot retransmissions in sidelink communications in accordance with one or more aspects of the present disclosure.

FIG. 9 shows a diagram of a system 900 including a device 905 that supports configurable mini-slot retransmissions in sidelink communications in accordance with one or more aspects of the present disclosure. The device 905 may be an example of or include the components of a device 605, a device 705, or a UE 115 as described herein. The device 905 may communicate (e.g., wirelessly) with one or more network entities 105, one or more UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally, or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting configurable mini-slot retransmissions in sidelink communications). For example, the device 905 or a component of the device 905 may include a processor 940 and memory 930 coupled with or to the processor 940, the processor 940 and memory 930 configured to perform various functions described herein.

The communications manager 920 may support wireless communication at a UE in accordance with examples as disclosed herein. For example, the communications manager 920 may be configured as or otherwise support a means for transmitting, via sidelink, a set of multiple sidelink TBs in a set of multiple sub-intervals of a first time interval. The communications manager 920 may be configured as or otherwise support a means for communicating an indication that a subset of sub-intervals of a second time interval are scheduled for retransmission, the second time interval occurring after the first time interval. The communications manager 920 may be configured as or otherwise support a means for transmitting a first sidelink TB of the set of multiple sidelink TB s via a first sub-interval of the subset of sub-intervals of the second time interval in accordance with a TB retransmission selection scheme, where the TB retransmission selection scheme indicates to select the first sidelink TB for retransmission in the first sub-interval based on a parameter associated with the first sidelink TB.

Additionally, or alternatively, the communications manager 920 may support wireless communication at a UE in accordance with examples as disclosed herein. For example, the communications manager 920 may be configured as or otherwise support a means for receiving, via sidelink, a set of multiple sidelink TBs in a set of multiple sub-intervals of a first time interval. The communications manager 920 may be configured as or otherwise support a means for receiving an indication that a subset of sub-intervals of a second time interval are scheduled for retransmission, the second time interval occurring after the first time interval. The communications manager 920 may be configured as or otherwise support a means for monitoring for a first sidelink TB of the set of multiple sidelink TBs via a first sub-interval of the subset of sub-intervals of the second time interval in accordance with a TB retransmission selection scheme, where the TB retransmission selection scheme indicates the first sidelink TB is selected for retransmission in the first sub-interval based on a parameter associated with the first sidelink TB.

By including or configuring the communications manager 920 in accordance with examples as described herein, the device 905 may support techniques for improved sidelink resource usage and reduced sidelink communication latency, which may improve power consumption, user experience, and robustness of a sidelink channel.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of configurable mini-slot retransmissions in sidelink communications as described herein, or the processor 940 and the memory 930 may be otherwise configured to perform or support such operations.

Figure 10:
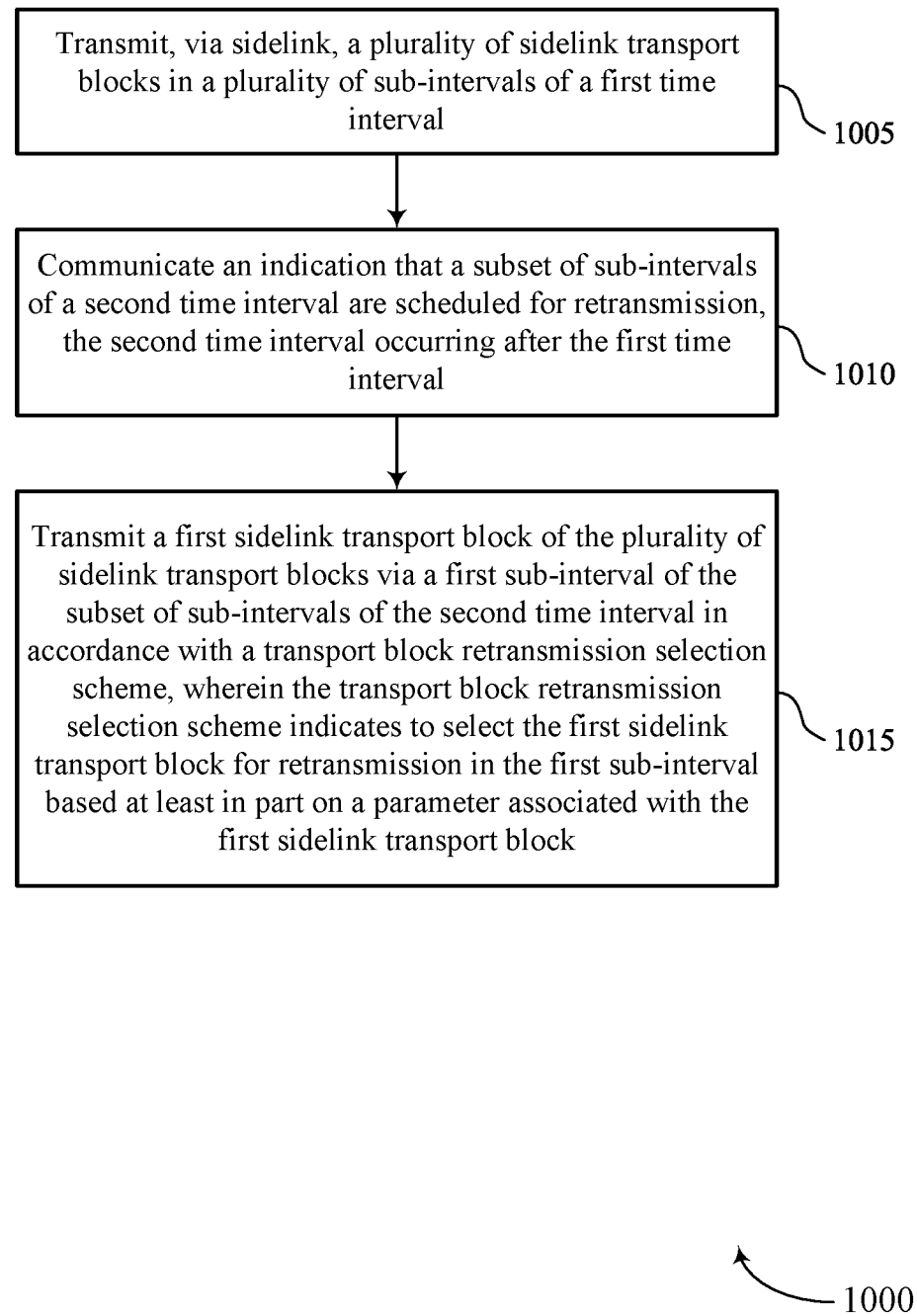
FIGS. 10 through 13 show flowcharts illustrating methods that support configurable mini-slot retransmissions in sidelink communications in accordance with one or more aspects of the present disclosure.

FIG. 10 shows a flowchart illustrating a method 1000 that supports configurable mini-slot retransmissions in sidelink communications in accordance with one or more aspects of the present disclosure. The operations of the method 1000 may be implemented by a UE or its components as described herein. For example, the operations of the method 1000 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1005, the method may include transmitting, via sidelink, a set of multiple sidelink TB s in a set of multiple sub-intervals of a first time interval. The operations of 1005 may be performed in accordance with examples as disclosed herein. In some examples, aspects of the operations of 1005 may be performed by a data transmission component 825 as described with reference to FIG. 8.

At 1010, the method may include communicating an indication that a subset of sub-intervals of a second time interval are scheduled for retransmission, the second time interval occurring after the first time interval. The operations of 1010 may be performed in accordance with examples as disclosed herein. In some examples, aspects of the operations of 1010 may be performed by a scheduling announcement component 830 as described with reference to FIG. 8.

At 1015, the method may include transmitting a first sidelink TB of the set of multiple sidelink TBs via a first sub-interval of the subset of sub-intervals of the second time interval in accordance with a TB retransmission selection scheme, where the TB retransmission selection scheme indicates to select the first sidelink TB for retransmission in the first sub-interval based on a parameter associated with the first sidelink TB. The operations of 1015 may be performed in accordance with examples as disclosed herein. In some examples, aspects of the operations of 1015 may be performed by a data transmission component 825 as described with reference to FIG. 8.

Figure 11:
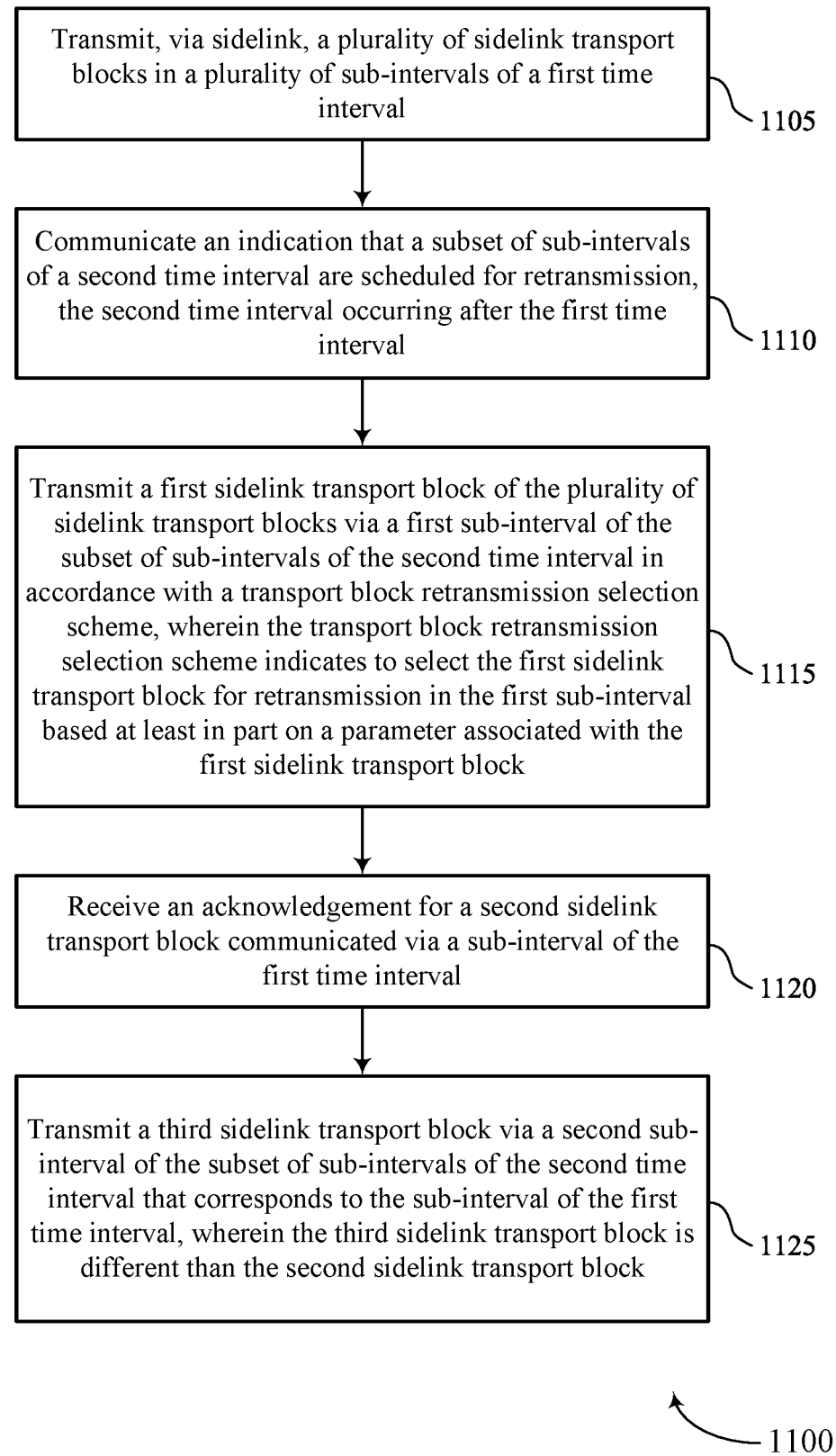

FIG. 11 shows a flowchart illustrating a method 1100 that supports configurable mini-slot retransmissions in sidelink communications in accordance with one or more aspects of the present disclosure. The operations of the method 1100 may be implemented by a UE or its components as described herein. For example, the operations of the method 1100 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1105, the method may include transmitting, via sidelink, a set of multiple sidelink TBs in a set of multiple sub-intervals of a first time interval. The operations of 1105 may be performed in accordance with examples as disclosed herein. In some examples, aspects of the operations of 1105 may be performed by a data transmission component 825 as described with reference to FIG. 8.

At 1110, the method may include communicating an indication that a subset of sub-intervals of a second time interval are scheduled for retransmission, the second time interval occurring after the first time interval. The operations of 1110 may be performed in accordance with examples as disclosed herein. In some examples, aspects of the operations of 1110 may be performed by a scheduling announcement component 830 as described with reference to FIG. 8.

At 1115, the method may include transmitting a first sidelink TB of the set of multiple sidelink TBs via a first sub-interval of the subset of sub-intervals of the second time interval in accordance with a TB retransmission selection scheme, where the TB retransmission selection scheme indicates to select the first sidelink TB for retransmission in the first sub-interval based on a parameter associated with the first sidelink TB. The operations of 1115 may be performed in accordance with examples as disclosed herein. In some examples, aspects of the operations of 1115 may be performed by a data transmission component 825 as described with reference to FIG. 8.

At 1120, the method may include receiving an ACK for a second sidelink TB communicated via a sub-interval of the first time interval. The operations of 1120 may be performed in accordance with examples as disclosed herein. In some examples, aspects of the operations of 1120 may be performed by a feedback reception component 845 as described with reference to FIG. 8.

At 1125, the method may include transmitting a third sidelink TB via a second sub-interval of the subset of sub-intervals of the second time interval that corresponds to the sub-interval of the first time interval, where the third sidelink TB is different than the second sidelink TB. The operations of 1125 may be performed in accordance with examples as disclosed herein. In some examples, aspects of the operations of 1125 may be performed by a data transmission component 825 as described with reference to FIG. 8.

Figure 12:
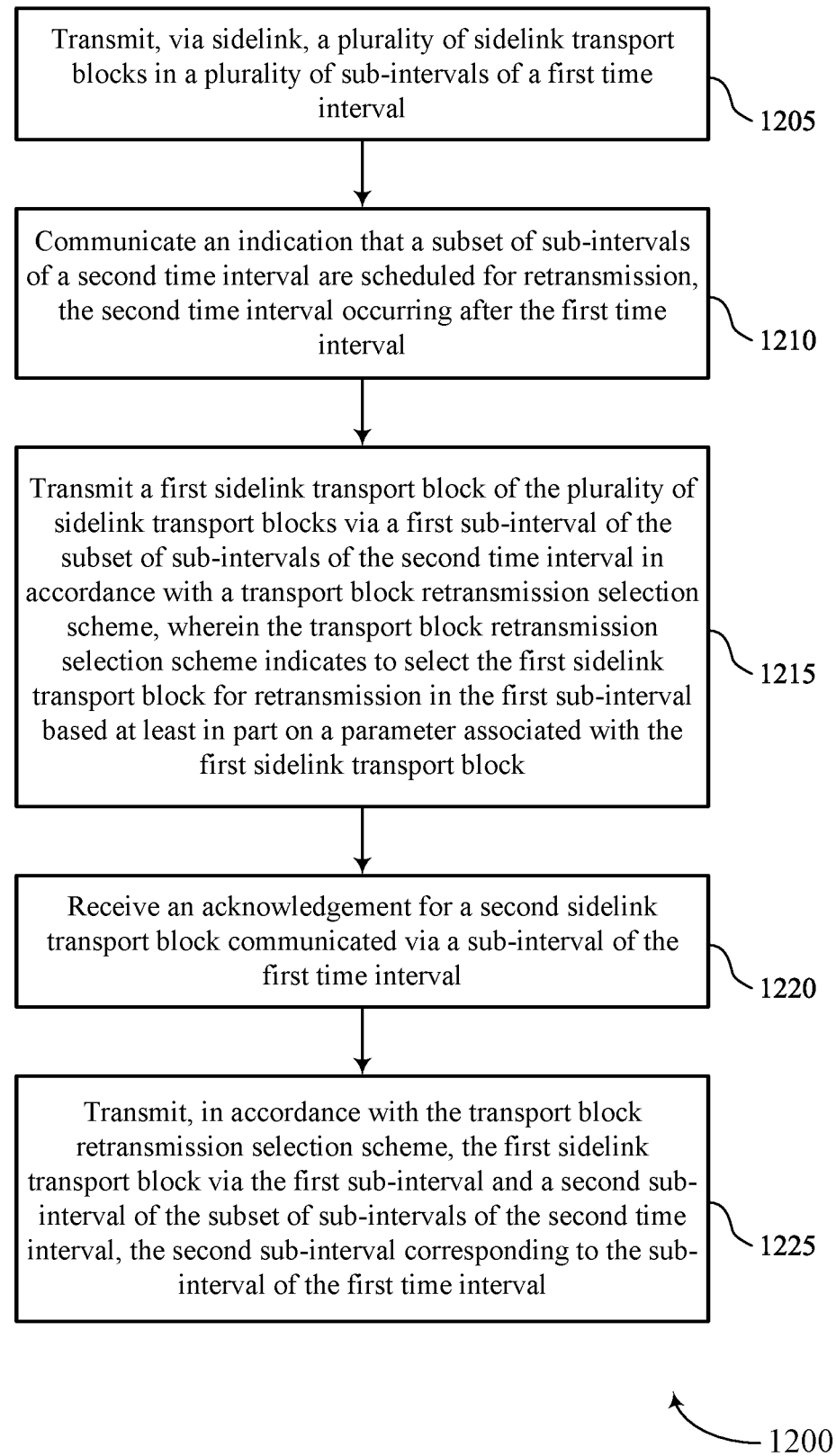

FIG. 12 shows a flowchart illustrating a method 1200 that supports configurable mini-slot retransmissions in sidelink communications in accordance with one or more aspects of the present disclosure. The operations of the method 1200 may be implemented by a UE or its components as described herein. For example, the operations of the method 1200 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1205, the method may include transmitting, via sidelink, a set of multiple sidelink TB s in a set of multiple sub-intervals of a first time interval. The operations of 1205 may be performed in accordance with examples as disclosed herein. In some examples, aspects of the operations of 1205 may be performed by a data transmission component 825 as described with reference to FIG. 8.

At 1210, the method may include communicating an indication that a subset of sub-intervals of a second time interval are scheduled for retransmission, the second time interval occurring after the first time interval. The operations of 1210 may be performed in accordance with examples as disclosed herein. In some examples, aspects of the operations of 1210 may be performed by a scheduling announcement component 830 as described with reference to FIG. 8.

At 1215, the method may include transmitting a first sidelink TB of the set of multiple sidelink TB s via a first sub-interval of the subset of sub-intervals of the second time interval in accordance with a TB retransmission selection scheme, where the TB retransmission selection scheme indicates to select the first sidelink TB for retransmission in the first sub-interval based on a parameter associated with the first sidelink TB. The operations of 1215 may be performed in accordance with examples as disclosed herein. In some examples, aspects of the operations of 1215 may be performed by a data transmission component 825 as described with reference to FIG. 8.

At 1220, the method may include receiving an ACK for a second sidelink TB communicated via a sub-interval of the first time interval. The operations of 1220 may be performed in accordance with examples as disclosed herein. In some examples, aspects of the operations of 1220 may be performed by a data transmission component 825 as described with reference to FIG. 8.

At 1225, the method may include transmitting, in accordance with the TB retransmission selection scheme, the first sidelink TB via the first sub-interval and a second sub-interval of the subset of sub-intervals of the second time interval, the second sub-interval corresponding to the sub-interval of the first time interval. The operations of 1225 may be performed in accordance with examples as disclosed herein. In some examples, aspects of the operations of 1225 may be performed by 850 as described with reference to FIG. 8.

Figure 13:
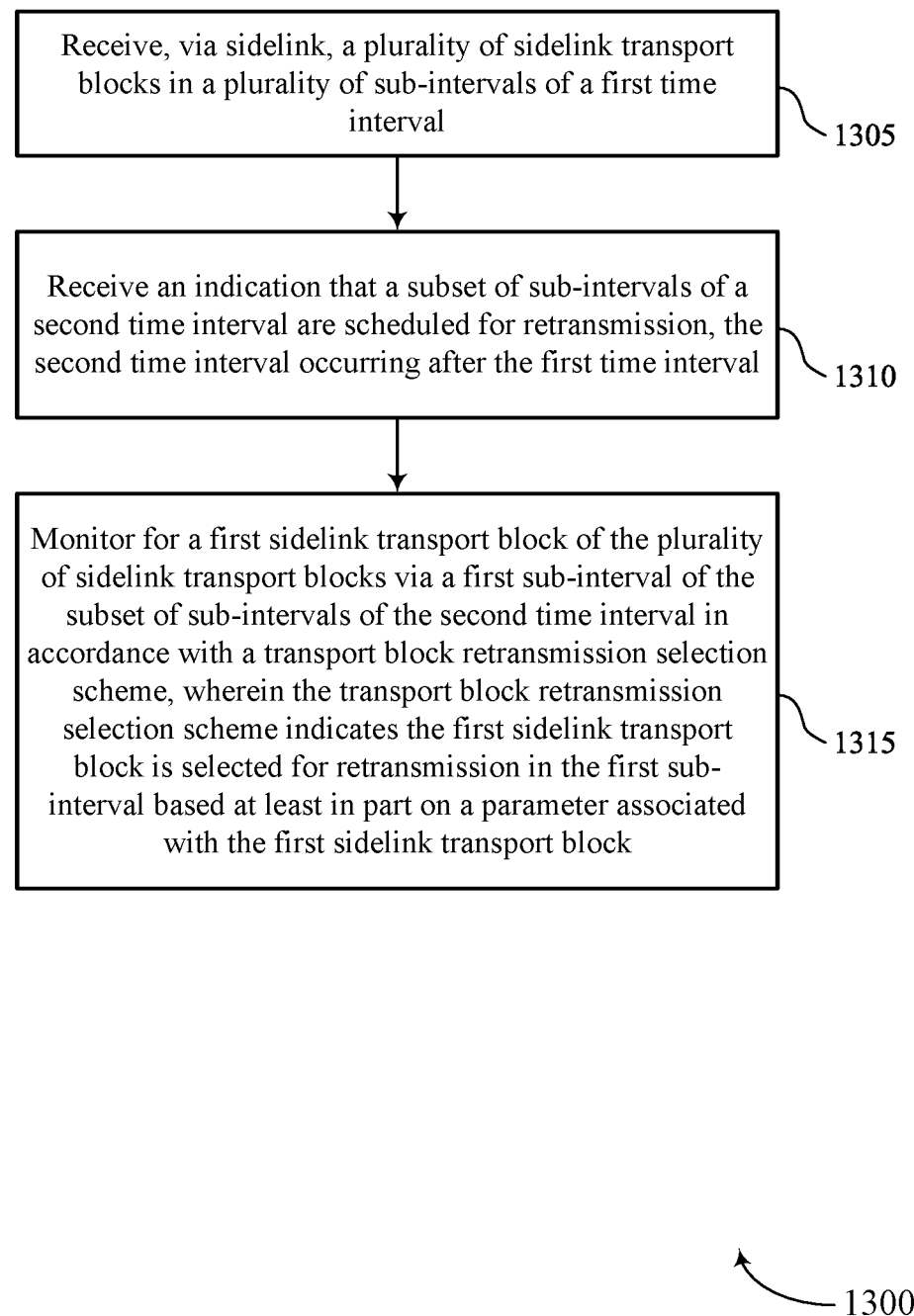

FIG. 13 shows a flowchart illustrating a method 1300 that supports configurable mini-slot retransmissions in sidelink communications in accordance with one or more aspects of the present disclosure. The operations of the method 1300 may be implemented by a UE or its components as described herein. For example, the operations of the method 1300 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1305, the method may include receiving, via sidelink, a set of multiple sidelink TBs in a set of multiple sub-intervals of a first time interval. The operations of 1305 may be performed in accordance with examples as disclosed herein. In some examples, aspects of the operations of 1305 may be performed by a data reception component 835 as described with reference to FIG. 8.

At 1310, the method may include receiving an indication that a subset of sub-intervals of a second time interval are scheduled for retransmission, the second time interval occurring after the first time interval. The operations of 1310 may be performed in accordance with examples as disclosed herein. In some examples, aspects of the operations of 1310 may be performed by a scheduling reception component 840 as described with reference to FIG. 8.

At 1315, the method may include monitoring for a first sidelink TB of the set of multiple sidelink TBs via a first sub-interval of the subset of sub-intervals of the second time interval in accordance with a TB retransmission selection scheme, where the TB retransmission selection scheme indicates the first sidelink TB is selected for retransmission in the first sub-interval based on a parameter associated with the first sidelink TB. The operations of 1315 may be performed in accordance with examples as disclosed herein. In some examples, aspects of the operations of 1315 may be performed by a data reception component 835 as described with reference to FIG. 8.

The following provides an overview of aspects of the present disclosure:

Aspect 1: A method for wireless communication at a UE, comprising: transmitting, via sidelink, a plurality of sidelink TB s in a plurality of sub-intervals of a first time interval; communicating an indication that a subset of sub-intervals of a second time interval are scheduled for retransmission, the second time interval occurring after the first time interval; and transmitting a first sidelink TB of the plurality of sidelink TBs via a first sub-interval of the subset of sub-intervals of the second time interval in accordance with a TB retransmission selection scheme, wherein the TB retransmission selection scheme indicates to select the first sidelink TB for retransmission in the first sub-interval based at least in part on a parameter associated with the first sidelink TB.

Aspect 2: The method of aspect 1, further comprising: receiving, from at least one other UE, a bitmap comprising feedback information for the plurality of sidelink TBs, wherein communicating the indication that the subset of sub-intervals of the second time interval are scheduled for retransmission is based at least in part on receiving the bitmap.

Aspect 3: The method of any of aspects 1 through 2, further comprising: receiving a NACK for a second sidelink TB of the plurality of sidelink TBs communicated via a sub-interval of the first time interval; and transmitting, in accordance with the TB retransmission selection scheme, the first sidelink TB via the first sub-interval based at least in part on receiving the NACK, wherein the first sub-interval corresponds to the sub-interval for the first time interval and the first sidelink TB is a retransmission of the second sidelink TB.

Aspect 4: The method of any of aspects 1 through 2, further comprising: receiving an ACK for a second sidelink TB communicated via a sub-interval of the first time interval; transmitting a third sidelink TB via a second sub-interval of the subset of sub-intervals of the second time interval that corresponds to the sub-interval of the first time interval, wherein the third sidelink TB is different than the second sidelink TB.

Aspect 5: The method of aspect 4, further comprising: transmitting a SCI message comprising a NDI, a HARQ ID, or both, associated with the third sidelink TB.

Aspect 6: The method of any of aspects 1 through 2, further comprising: receiving an ACK for a second sidelink TB communicated via a sub-interval of the first time interval; transmitting, in accordance with the TB retransmission selection scheme, the first sidelink TB via the first sub-interval and a second sub-interval of the subset of sub-intervals of the second time interval, the second sub-interval corresponding to the sub-interval of the first time interval.

Aspect 7: The method of aspect 6, further comprising: transmitting the first sidelink TB via the first sub-interval according to a first channel coding rate; and transmitting the first sidelink TB via the second sub-interval according to a second channel coding rate that differs from the first channel coding rate.

Aspect 8: The method of any of aspects 6 through 7, wherein transmitting the first sidelink TB via the first sub-interval and the second sub-interval is based at least in part on a first priority, a first quality service, or both associated with the first sidelink TB being equal to or higher than a second priority, a second QoS, or both associated with the second sidelink TB.

Aspect 9: The method of any of aspects 6 through 8, wherein transmitting the first sidelink TB via the first sub-interval and the second sub-interval is based at least in part on a first remaining PDB associated with the first sidelink TB being lower than a second remaining PDB associated with a third sidelink TB of the plurality of sidelink TBs.

Aspect 10: The method of any of aspects 6 through 9, wherein transmitting the first sidelink TB via the first sub-interval and the second sub-interval is based at least in part on one or more resources associated with the first sidelink TB overlapping with one or more resources associated with the second sidelink TB.

Aspect 11: The method of any of aspects 1 through 10, wherein the TB retransmission selection scheme indicates to refrain from retransmitting a second sidelink TB of the plurality of sidelink TBs based at least in part on a PDB for the second sidelink TB expiring.

Aspect 12: The method of any of aspects 1 through 11, wherein the parameter associated with the first sidelink TB comprises a priority associated with the first sidelink TB, a QoS associated with the first sidelink TB, a remaining PDB for the first sidelink TB, a size of a payload associated with the first sidelink TB, a quantity of time-frequency resources associated with the first sidelink TB, or any combination thereof.

Aspect 13: The method of any of aspects 1 through 12, further comprising: receiving a message indicating a configuration for a resource pool for at least the first time interval and the second time interval, wherein the TB retransmission selection scheme is based at least in part on the configuration.

Aspect 14: The method of aspect 13, wherein the message is received via a Layer-1 message, a Layer-2 message, or a Layer-3 message.

Aspect 15: The method of any of aspects 1 through 14, wherein the first time interval comprises a slot and the plurality of sub-intervals comprise a plurality of sub-slots.

Aspect 16: A method for wireless communication at a UE, comprising: receiving, via sidelink, a plurality of sidelink TB s in a plurality of sub-intervals of a first time interval; receiving an indication that a subset of sub-intervals of a second time interval are scheduled for retransmission, the second time interval occurring after the first time interval; and monitoring for a first sidelink TB of the plurality of sidelink TB s via a first sub-interval of the subset of sub-intervals of the second time interval in accordance with a TB retransmission selection scheme, wherein the TB retransmission selection scheme indicates the first sidelink TB is selected for retransmission in the first sub-interval based at least in part on a parameter associated with the first sidelink TB.

Aspect 17: The method of aspect 16, further comprising: transmitting, to at least one other UE, a bitmap comprising feedback information for the plurality of sidelink TBs, wherein receiving the indication that the subset of sub-intervals of the second time interval are scheduled for retransmission is based at least in part on transmitting the bitmap.

Aspect 18: The method of any of aspects 16 through 17, further comprising: transmitting a NACK for a second sidelink TB of the plurality of sidelink TBs communicated via a sub-interval of the first time interval; and receiving, in accordance with the TB retransmission selection scheme, the first sidelink TB via the first sub-interval based at least in part on receiving the NACK, wherein the first sub-interval corresponds to the sub-interval for the first time interval and the first sidelink TB is a retransmission of the second sidelink TB.

Aspect 19: The method of any of aspects 16 through 17, further comprising: transmitting an ACK for a second sidelink TB communicated via a sub-interval of the first time interval; receiving a third sidelink TB via a second sub-interval of the subset of sub-intervals of the second time interval that corresponds to the sub-interval of the first time interval, wherein the third sidelink TB is different than the second sidelink TB.

Aspect 20: The method of aspect 19, further comprising: receiving a SCI message comprising a NDI, a HARQ ID, or both, associated with the third sidelink TB.

Aspect 21: The method of any of aspects 16 through 17, further comprising: transmitting an ACK for a second sidelink TB communicated via a sub-interval of the first time interval; receiving, in accordance with the TB retransmission selection scheme, the first sidelink TB via the first sub-interval and a second sub-interval of the subset of sub-intervals of the second time interval, the second sub-interval corresponding to the sub-interval of the first time interval.

Aspect 22: The method of aspect 21, further comprising: receiving the first sidelink TB via the first sub-interval according to a first channel coding rate; and receiving the first sidelink TB via the second sub-interval according to a second channel coding rate that differs from the first channel coding rate.

Aspect 23: The method of any of aspects 21 through 22, wherein receiving the first sidelink TB via the first sub-interval and the second sub-interval is based at least in part on a first priority, a first quality service, or both associated with the first sidelink TB being equal to or higher than a second priority, a second QoS, or both associated with the second sidelink TB.

Aspect 24: The method of any of aspects 21 through 23, wherein receiving the first sidelink TB via the first sub-interval and the second sub-interval is based at least in part on a first remaining PDB associated with the first sidelink TB being lower than a second remaining PDB associated with a third sidelink TB of the plurality of sidelink TB s.

Aspect 25: The method of any of aspects 21 through 24, wherein receiving the first sidelink TB via the first sub-interval and the second sub-interval is based at least in part on one or more resources associated with the first sidelink TB overlapping with one or more resources associated with the second sidelink TB.

Aspect 26: The method of any of aspects 16 through 25, wherein the parameter associated with the first sidelink TB comprises a priority associated with the first sidelink TB, a QoS associated with the first sidelink TB, a remaining PDB for the first sidelink TB, a size of a payload associated with the first sidelink TB, a quantity of time-frequency resources associated with the first sidelink TB, or any combination thereof.

Aspect 27: The method of any of aspects 16 through 26, further comprising: receiving a message indicating a configuration for a resource pool comprising at least the first time interval and the second time interval, wherein the TB retransmission selection scheme is based at least in part on the configuration.

Aspect 28: The method of aspect 27, wherein the message is received via a Layer-1 message, a Layer-2 message, or a Layer-3 message.

Aspect 29: An apparatus for wireless communication at a UE, comprising a processor; memory coupled with the processor; and instructions stored in the memory and executable by the processor to cause the apparatus to perform a method of any of aspects 1 through 15.

Aspect 30: An apparatus for wireless communication at a UE, comprising at least one means for performing a method of any of aspects 1 through 15.

Aspect 31: A non-transitory computer-readable medium storing code for wireless communication at a UE, the code comprising instructions executable by a processor to perform a method of any of aspects 1 through 15.

Aspect 32: An apparatus for wireless communication at a UE, comprising a processor; memory coupled with the processor; and instructions stored in the memory and executable by the processor to cause the apparatus to perform a method of any of aspects 16 through 28.

Aspect 33: An apparatus for wireless communication at a UE, comprising at least one means for performing a method of any of aspects 16 through 28.

Aspect 34: A non-transitory computer-readable medium storing code for wireless communication at a UE, the code comprising instructions executable by a processor to perform a method of any of aspects 16 through 28.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A user equipment (UE) for wireless communications, comprising:
   one or more memories comprising processor-executable code; and
   one or more processors coupled with the one or more memories and individually or collectively operable to execute the code to cause the UE to:
   transmit, via sidelink, a plurality of sidelink transport blocks in a plurality of sub-intervals of a first time interval;
   communicate an indication that a subset of sub-intervals of a second time interval are scheduled for retransmission, the second time interval occurring after the first time interval;
   transmit a first sidelink transport block of the plurality of sidelink transport blocks via a first sub-interval of the subset of sub-intervals of the second time interval in accordance with a transport block retransmission selection scheme, wherein the transport block retransmission selection scheme indicates to select the first sidelink transport block for retransmission in the first sub-interval based at least in part on a parameter associated with the first sidelink transport block;
   receive an acknowledgment for a second sidelink transport block communicated via a sub-interval of the first time interval; and
   transmit, in accordance with the transport block retransmission selection scheme, the first sidelink transport block via the first sub-interval and a second sub-interval of the subset of sub-intervals of the second time interval, the second sub-interval corresponding to the sub-interval of the first time interval, wherein transmission of the first sidelink transport block via the first sub-interval and the second sub-interval is based at least in part on one or more resources associated with the first sidelink transport block overlapping with one or more resources associated with the second sidelink transport block.

2. The UE of claim 1, wherein the one or more processors are individually or collectively further operable to execute the code to cause the UE to:
   receive, from at least one other UE, a bitmap comprising feedback information for the plurality of sidelink transport blocks, wherein communicating the indication that the subset of sub-intervals of the second time interval are scheduled for retransmission is based at least in part on receiving the bitmap.

3. The UE of claim 1, wherein the one or more processors are individually or collectively further operable to execute the code to cause the UE to:
   transmit the first sidelink transport block via the first sub-interval according to a first channel coding rate; and
   transmit the first sidelink transport block via the second sub-interval according to a second channel coding rate that differs from the first channel coding rate.

4. The UE of claim 1, wherein transmitting the first sidelink transport block via the first sub-interval and the second sub-interval is based at least in part on a first priority, a first quality service, or both associated with the first sidelink transport block being equal to or higher than a second priority, a second quality of service, or both associated with the second sidelink transport block.

5. The UE of claim 1, wherein transmitting the first sidelink transport block via the first sub-interval and the second sub-interval is based at least in part on a first remaining packet delay budget associated with the first sidelink transport block being lower than a second remaining packet delay budget associated with a third sidelink transport block of the plurality of sidelink transport blocks.

6. The UE of claim 1, wherein the parameter associated with the first sidelink transport block comprises a priority associated with the first sidelink transport block, a quality of service associated with the first sidelink transport block, a remaining packet delay budget for the first sidelink transport block, a size of a payload associated with the first sidelink transport block, a quantity of time-frequency resources associated with the first sidelink transport block, or any combination thereof.

7. The UE of claim 1, wherein the one or more processors are individually or collectively further operable to execute the code to cause the UE to:
   receive a message indicating a configuration for a resource pool for at least the first time interval and the second time interval, wherein the transport block retransmission selection scheme is based at least in part on the configuration.

8. The UE of claim 7, wherein the message is received via a Layer-1 message, a Layer-2 message, or a Layer-3 message.

9. The UE of claim 1, wherein the first time interval comprises a slot and the plurality of sub-intervals comprise a plurality of sub-slots.

10. A user equipment (UE) for wireless communications, comprising:

one or more memories comprising processor-executable code; and one or more processors coupled with the one or more memories and individually or collectively operable to execute the code to cause the UE to:
  receive, via sidelink, a plurality of sidelink transport blocks in a plurality of sub-intervals of a first time interval;
  receive an indication that a subset of sub-intervals of a second time interval are scheduled for retransmission, the second time interval occurring after the first time interval;
  monitor for a first sidelink transport block of the plurality of sidelink transport blocks via a first sub-interval of the subset of sub-intervals of the second time interval in accordance with a transport block retransmission selection scheme, wherein the transport block retransmission selection scheme indicates the first sidelink transport block is selected for retransmission in the first sub-interval based at least in part on a parameter associated with the first sidelink transport block;
  transmit an acknowledgment for a second sidelink transport block communicated via a sub-interval of the first time interval; and
  receive, in accordance with the transport block retransmission selection scheme, the first sidelink transport block via the first sub-interval and a second sub-interval of the subset of sub-intervals of the second time interval, the second sub-interval corresponding to the sub-interval of the first time interval, wherein receiving the first sidelink transport block via the first sub-interval and the second sub-interval is based at least in part on one or more resources associated with the first sidelink transport block overlapping with one or more resources associated with the second sidelink transport block.

11. The UE of claim 10, wherein the one or more processors are individually or collectively further operable to execute the code to cause the UE to:
  transmit, to at least one other UE, a bitmap comprising feedback information for the plurality of sidelink transport blocks, wherein receiving the indication that the subset of sub-intervals of the second time interval are scheduled for retransmission is based at least in part on transmitting the bitmap.

12. The UE of claim 10, wherein the one or more processors are individually or collectively further operable to execute the code to cause the UE to:
  receive the first sidelink transport block via the first sub-interval according to a first channel coding rate; and
  receive the first sidelink transport block via the second sub-interval according to a second channel coding rate that differs from the first channel coding rate.

13. The UE of claim 10, wherein receiving the first sidelink transport block via the first sub-interval and the second sub-interval is based at least in part on a first priority, a first quality service, or both associated with the first sidelink transport block being equal to or higher than a second priority, a second quality of service, or both associated with the second sidelink transport block.

14. The UE of claim 10, wherein receiving the first sidelink transport block via the first sub-interval and the second sub-interval is based at least in part on a first remaining packet delay budget associated with the first sidelink transport block being lower than a second remaining packet delay budget associated with a third sidelink transport block of the plurality of sidelink transport blocks.

15. The UE of claim 10, wherein the parameter associated with the first sidelink transport block comprises a priority associated with the first sidelink transport block, a quality of service associated with the first sidelink transport block, a remaining packet delay budget for the first sidelink transport block, a size of a payload associated with the first sidelink transport block, a quantity of time-frequency resources associated with the first sidelink transport block, or any combination thereof.

16. The UE of claim 10, wherein the one or more processors are individually or collectively further operable to execute the code to cause the UE to:
  receive a message indicating a configuration for a resource pool comprising at least the first time interval and the second time interval, wherein the transport block retransmission selection scheme is based at least in part on the configuration.

17. The UE of claim 16, wherein the message is received via a Layer-1 message, a Layer-2 message, or a Layer-3 message.

18. A method for wireless communication at a user equipment (UE), comprising:
  transmitting, via sidelink, a plurality of sidelink transport blocks in a plurality of sub-intervals of a first time interval;
  communicating an indication that a subset of sub-intervals of a second time interval are scheduled for retransmission, the second time interval occurring after the first time interval;
  transmitting a first sidelink transport block of the plurality of sidelink transport blocks via a first sub-interval of the subset of sub-intervals of the second time interval in accordance with a transport block retransmission selection scheme, wherein the transport block retransmission selection scheme indicates to select the first sidelink transport block for retransmission in the first sub-interval based at least in part on a parameter associated with the first sidelink transport block;
  receiving an acknowledgment for a second sidelink transport block communicated via a sub-interval of the first time interval; and
  transmitting, in accordance with the transport block retransmission selection scheme, the first sidelink transport block via the first sub-interval and a second sub-interval of the subset of sub-intervals of the second time interval, the second sub-interval corresponding to the sub-interval of the first time interval, wherein transmission of the first sidelink transport block via the first sub-interval and the second sub-interval is based at least in part on one or more resources associated with the first sidelink transport block overlapping with one or more resources associated with the second sidelink transport block.

19. A method for wireless communication at a user equipment (UE), comprising:
  receiving, via sidelink, a plurality of sidelink transport blocks in a plurality of sub-intervals of a first time interval;
  receiving an indication that a subset of sub-intervals of a second time interval are scheduled for retransmission, the second time interval occurring after the first time interval;
  monitoring for a first sidelink transport block of the plurality of sidelink transport blocks via a first sub-interval of the subset of sub-intervals of the second time interval in accordance with a transport block retransmission selection scheme, wherein the transport block retransmission selection scheme indicates the first sidelink transport block is selected for retransmission in the first sub-interval based at least in part on a parameter associated with the first sidelink transport block;

transmitting an acknowledgment for a second sidelink transport block communicated via a sub-interval of the first time interval; and receiving, in accordance with the transport block retransmission selection scheme, the first sidelink transport block via the first sub-interval and a second sub-interval of the subset of sub-intervals of the second time interval, the second sub-interval corresponding to the sub-interval of the first time interval, wherein receiving the first sidelink transport block via the first sub-interval and the second sub-interval is based at least in part on one or more resources associated with the first sidelink transport block overlapping with one or more resources associated with the second sidelink transport block.

* * * * *